US012795383B2

(12) United States Patent
Alasti et al.

(10) Patent No.: US 12,795,383 B2
(45) Date of Patent: Nov. 10, 2026

(54) TERRESTRIAL AND NON-TERRESTRIAL NETWORK INTERFERENCE MITIGATION

(71) Applicant: Boost SubscriberCo L.L.C., Englewood, CO (US)

(72) Inventors: Mehdi Alasti, Arlington, VA (US); Gurpreet Sohi, Parker, CO (US); Siddhartha Chenumolu, Ashburn, VA (US); Sourabh Gupta, Ashburn, VA (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 160 days.

(21) Appl. No.: 18/600,398

(22) Filed: Mar. 8, 2024

(65) Prior Publication Data

US 2025/0287217 A1 Sep. 11, 2025

(51) Int. Cl.

*H04W 16/14* (2009.01)
*H04W 16/30* (2009.01)
*H04W 84/06* (2009.01)

(52) U.S. Cl.

CPC .......... *H04W 16/14* (2013.01); *H04W 16/30* (2013.01); *H04W 84/06* (2013.01)

(58) Field of Classification Search

CPC ..... H04W 16/14; H04W 16/30; H04W 84/06; H04B 7/18539; H04B 7/2041; H04B 7/18563

See application file for complete search history.

(56) References Cited

U.S. PATENT DOCUMENTS

| | | | | |
|---|---|---|---|---|
| 11,277,197 | B2 | 3/2022 | Alasti et al. | |
| 2006/0211371 | A1 * | 9/2006 | Karabinis ............ | H04W 16/14 455/12.1 |
| 2017/0272131 | A1 | 9/2017 | Ananth et al. | |
| 2021/0036769 | A1 | 2/2021 | Sorond et al. | |

(Continued)

OTHER PUBLICATIONS

Thales, "NTN FR1 Coexistence Scenarios and Related Core Requirements," 3GPP TSG-RAN WG4 Meeting #98-e, R4-2101859, Jan. 25-Feb. 5, 2021, 10 pages.

(Continued)

*Primary Examiner* — David E Lotter

(74) *Attorney, Agent, or Firm* — Seed Intellectual Property Law Group LLP

(57) ABSTRACT

Systems and methods for mitigating terrestrial network downlink transmission interference on non-terrestrial network uplink transmissions or mitigating. The system determines that terrestrial network downlink transmissions for a terrestrial network and non-terrestrial network uplink transmissions for a non-terrestrial network utilize a same frequency band. One or more terrestrial cells of the terrestrial network that are in a coverage area of a non-terrestrial network satellite of the non-terrestrial network are identified. The one or more terrestrial network cells are instructed to utilize at least a first bandwidth utilization scheme for terrestrial network downlink transmissions. And the non-terrestrial network satellite of the non-terrestrial network is instructed to utilize a second bandwidth utilization scheme for non-terrestrial network uplink transmissions, wherein the second bandwidth utilization scheme is different from the first bandwidth utilization scheme.

19 Claims, 23 Drawing Sheets

(56) References Cited

U.S. PATENT DOCUMENTS

| | | | |
|---|---|---|---|
| 2022/0039026 A1 | 2/2022 | Sharma et al. | |
| 2022/0052779 A1 | 2/2022 | Ye et al. | |
| 2023/0413064 A1* | 12/2023 | Huang | H04W 16/14 |
| 2024/0014892 A1 | 1/2024 | Palermo et al. | |
| 2024/0022317 A1 | 1/2024 | Cho et al. | |
| 2024/0089823 A1 | 3/2024 | Gopal et al. | |
| 2024/0098507 A1 | 3/2024 | Medles et al. | |
| 2024/0267903 A1 | 8/2024 | Suh et al. | |
| 2025/0070951 A1 | 2/2025 | Zhou et al. | |
| 2025/0287217 A1 | 9/2025 | Alasti et al. | |
| 2025/0287218 A1 | 9/2025 | Alasti et al. | |
| 2025/0287264 A1 | 9/2025 | Alasti et al. | |

OTHER PUBLICATIONS

International Search Report and Written Opinion for International Application No. PCT/US2025/018397, dated Jun. 11, 2025, 14 pages.

International Search Report and Written Opinion, dated Jul. 23, 2025, for International Patent Application No. PCT/US2025/018396. (20 pages).

International Search Report and Written Opinion, dated Jul. 24, 2025, for International Patent Application No. PCT/US2025/018394. (19 pages).

Oh et al., "Compatibility Study on Terrestrial Radio System Operated in the Coverage of Multi-beam Satellite System," The 17th Asia Pacific Conference on Communications, Sabah, Malaysia, 2011, pp. 698-702, doi: 10.1109/APCC.2011.6152897.

Invitiation to Pay Additional Fees And, Where Applicable, Protest Fee, mailed Jun. 2, 2025, for International Application No. PCT/US2025/018396, 11 pages.

Invitiation to Pay Additional Fees And, Where Applicable, Protest Fee, mailed Jun. 3, 2025, for International Application No. PCT/US2025/018394, 11 pages.

* cited by examiner

TERRESTRIAL AND NON-TERRESTRIAL NETWORK INTERFERENCE MITIGATION

BACKGROUND

The use of cellular networks continues to expand and people are becoming more reliant on the speed, efficiency, and uptime of these networks. Advancements in cellular networks has allowed users to connect to a cellular network via a terrestrial network or a non-terrestrial network. But cellular devices are often designed to communicate with the network using specific frequencies, which can result in communication collisions, interference, delayed transmissions, or other communication issues. It is with respect to these and other considerations that the embodiments described herein have been made.

BRIEF SUMMARY

Briefly, embodiments are directed to systems and methods for mitigating terrestrial network downlink transmission interference on non-terrestrial network uplink transmissions. When terrestrial network downlink transmissions for a terrestrial network and non-terrestrial network uplink transmissions for a non-terrestrial network utilize a same frequency band, one or more bandwidth utilization schemes are selected for one or more terrestrial network cells and for a non-terrestrial network satellite. The one or more terrestrial network cells are instructed to utilize at least a first bandwidth utilization scheme for terrestrial network downlink transmissions. And the non-terrestrial network satellite of the non-terrestrial network is instructed to utilize a second bandwidth utilization scheme for non-terrestrial network uplink transmissions, wherein the second bandwidth utilization scheme is different from the first bandwidth utilization scheme. In some embodiments, the first bandwidth utilization scheme is generated to include a first order in which the one or more terrestrial network cells are to use bandwidth parts; and the second bandwidth utilization scheme is generated to include a second order in which the non-terrestrial network satellite is to use other bandwidth parts.

In some embodiments, the one or more terrestrial network cells are grouped into a first cluster and a second cluster. The first bandwidth utilization scheme is selected for the first cluster and a third bandwidth utilization scheme is selected for the second cluster. Each terrestrial network cell in the first cluster is instructed to utilize the first bandwidth utilization scheme for terrestrial network downlink transmissions, and each terrestrial network cell in the second cluster is instructed to utilize the third bandwidth utilization scheme for terrestrial network downlink transmissions

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
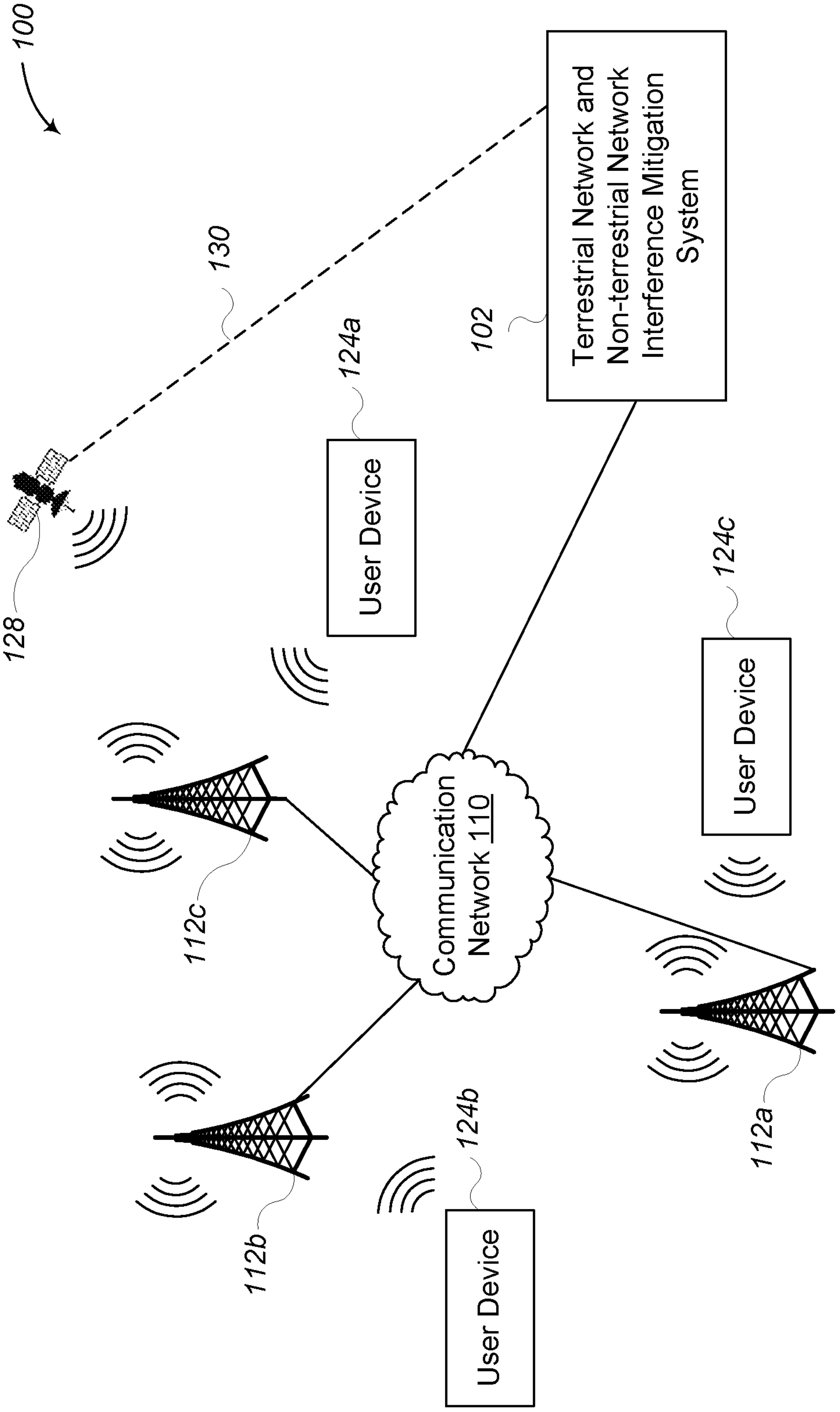
FIG. 1 illustrates a context diagram of an environment for employing terrestrial network and non-terrestrial network interference mitigation techniques in accordance with embodiments described herein.

FIG. 1 illustrates a context diagram of an environment 100 for employing terrestrial network and non-terrestrial network interference mitigation techniques in accordance with embodiments described herein. Environment 100 includes a plurality of terrestrial network cells 112*a*-112*c*, a non-terrestrial network satellite 128, a plurality of user devices 124*a*-124*c*, and a terrestrial network and non-terrestrial network interference mitigation system 102, which may be in communication via a communication network 110. Communication network 110 includes one or more wired or wireless networks, which may include a series of smaller or private connected networks that carry information between the terrestrial network cells 112*a*-112*c* and the terrestrial network and non-terrestrial network interference mitigation system 102.

The user devices 124*a*-124*c* are computing devices that receive and transmit cellular communication messages or data with the terrestrial network cells 112*a*-112*c* or the non-terrestrial network satellite 128. The user devices 112*a*-112*c* may include any combination of user devices that are configured to communicate with only terrestrial network cells 112*a*-112*c*, are configured to communicate with only non-terrestrial network satellite 128, or are configured to communicate with both the terrestrial network cells 112*a*-112*c* and the non-terrestrial network satellite 128. Examples of user devices 124*a*-124*c* may include, but are not limited to, mobile devices, smartphones, tablets, cellular-enabled laptop computers, very small aperture terminals (VSAT), Earth station in motion (ESIM), or other computing devices that can communication with a cellular network. User devices 124*a*-124*c* that are connected to or in communication with a terrestrial network cell 112 may be referred to as terrestrial user devices, and user devices 124*a*-124*c* that are connected to or in communication with a non-terrestrial network satellite 128 may be referred to as non-terrestrial user devices. Although FIG. 1 shows three user devices 124*a*-124*c*, embodiments are not so limited. Rather, one user device or a plurality of user devices may be employed.

The terrestrial network cells 112*a*-112*c* are ground-based cellular towers that together provide the hardware infrastructure of a terrestrial network or a terrestrial cellular communications network. The terrestrial network cells 112*a*-112*c* may be individually referred to as a terrestrial network cell 112 or collectively referred to as terrestrial network cells 112. The non-terrestrial network satellite 128 is a satellite-based cellular system or satellite that provides the hardware infrastructure of a non-terrestrial network or a non-terrestrial cellular communications network. In some embodiments or situations, the non-terrestrial network satellite 128 may also be referred to as a non-terrestrial network cell or as a non-terrestrial network payload depending on the architecture, configuration, or deployment of the non-terrestrial network. In some embodiments, a non-terrestrial network in 3GPP may refer to or include geostationary (GEO) satellites, low Earth orbit (LEO) satellites, or medium Earth orbit (MEO) satellites, or high-altitude platform stations (HAPS). The terrestrial network cells 112*a*-112*c* and the non-terrestrial network satellite 128 may include or be in communication with base stations, radio back haul equipment, antennas, or other devices, which are not illustrated for ease of discussion. Although FIG. 1 shows three terrestrial network cells 112*a*-112*c*, embodiments are not so limited. Rather, one terrestrial network cell or a plurality of terrestrial network cells may be employed. Similarly, although FIG. 1 shows one non-terrestrial network satellite 128, embodiments are not so limited. Rather, one non-terrestrial network satellite or a plurality of non-terrestrial network satellites may be employed.

The terrestrial network and the non-terrestrial network supported by the terrestrial network cells 112*a*-112*c* and the non-terrestrial network satellite 128 may be collectively referred to as a cellular communications network (also referred to as a wireless network), e.g., a 5G cellular communications network. Although embodiments are described herein with the terrestrial network and the non-terrestrial network being part of a collective cellular network, embodiments are not so limited. Embodiments described herein may also be employed in environments where the terrestrial network and the non-terrestrial network are separate, independent networks.

Terrestrial network cells 112 and the non-terrestrial network satellite 128 provide compatible cellular communications over a coverage area. The coverage area of each terrestrial network cell 112 may vary depending on the elevation antenna of the terrestrial network cell, the height of the antenna of the terrestrial network cell above the ground, the electrical tilt of the antenna, the transmit power utilized by the terrestrial network cell, or other capabilities that can be different from one type of terrestrial network cell to another or from one type of hardware to another. Likewise, the coverage area of the non-terrestrial network satellite 128 may vary depending on the orbit or position of the non-terrestrial network satellite, the elevation angle of the non-terrestrial network satellite, the transmit power utilized by the non-terrestrial network satellite, or other hardware capabilities of the non-terrestrial network satellite. The overall capacity of the terrestrial network created by the terrestrial network cells 112*a*-112*c* and the non-terrestrial network created by the non-terrestrial network satellite 128 depends on the coverage of each cell and the interference that the cells may have on each other.

In various embodiments, a group of terrestrial network cells 112*a*-112*c* that make up the cellular communication network may be referred to as a "market." A market may be for a particular city, neighborhood, geographical area, or other selected or specified cluster of cells. Similarly, a non-terrestrial network satellite 128 may have a coverage area that includes one or more markets of terrestrial network cells, and in many situations, the coverage area of the non-terrestrial network satellite 128 is much larger than a particular market for a group of terrestrial network cells. In situations where the coverage area of a terrestrial network cell overlaps (or borders) the coverage area of a non-terrestrial network satellite, the various techniques described herein may be employed to mitigate interference between the cells.

The terrestrial network and non-terrestrial network interference mitigation system 102 is configured to perform embodiments described herein to select specific bandwidth utilization schemes to be utilized by the terrestrial network cells 112*a*-112*c* and the non-terrestrial network satellite 128 depending on the interference. The terrestrial network and non-terrestrial network interference mitigation system 102 then instructs the terrestrial network cells 112*a*-112*c* and the non-terrestrial network satellite 128 to utilize the specific bandwidth utilization scheme selected for that cell. The terrestrial network cells 112*a*-112*c* and the non-terrestrial network satellite 128 are configured to utilize or employ the specific bandwidth utilization scheme in which they are instructed to use.

Figure 2:
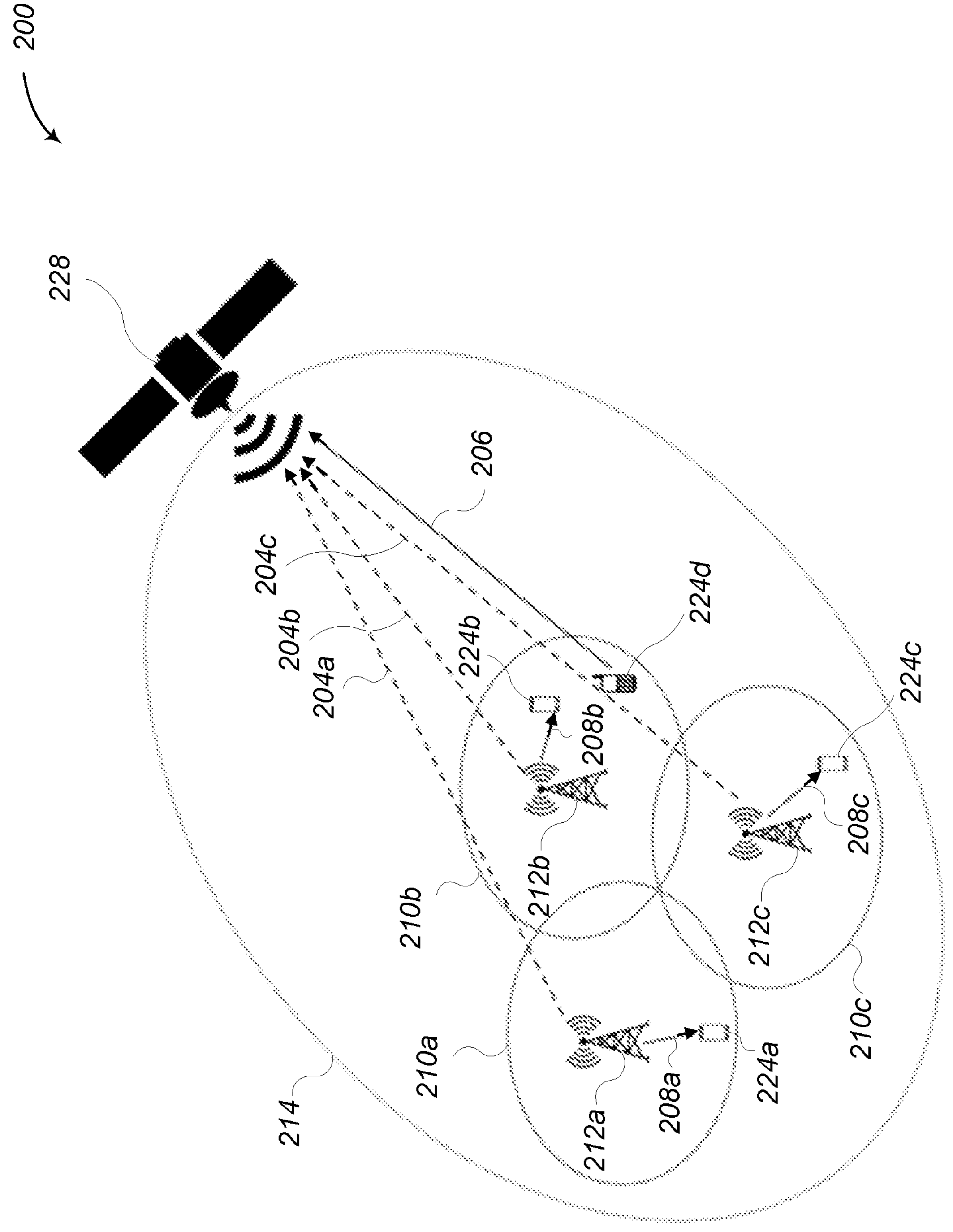
FIG. 2 is a context diagram of a non-limiting example illustration of an environment with terrestrial network downlink transmission interference on non-terrestrial network uplink transmissions in accordance with embodiments described herein.

FIG. 2 is a context diagram of a non-limiting example illustration of an environment 200 where terrestrial network downlink transmission interference on non-terrestrial network uplink transmissions in accordance with embodiments described herein.

Environment 200 includes a non-terrestrial network satellite 228, terrestrial network cells 212*a*-212*c*, and user devices 224*a*-224*e*, which may be embodiments, of the non-terrestrial network satellite 128, the terrestrial network cells 112*a*-112*c*, and the user devices 124*a*-124*c* in FIG. 1, respectively. These elements are given separate reference numbers for ease of illustration. The terrestrial network cells 212*a*-212*c* have respective coverage areas 210*a*-210*c*, which at least partially overlap the coverage area 214 of the non-terrestrial network satellite 228.

In this illustration, the non-terrestrial network satellite 228 is utilizing non-terrestrial network uplink transmission 206 to receive data from user device 224*d*. And the terrestrial network cells 212*a*, 212*b*, and 212*c* are utilizing terrestrial network downlink transmissions 208*a*, 208*b*, and 208*c* to transmit data to user devices 224*a*, 224*b*, and 224*c*, respectively. These terrestrial network downlink transmissions utilized by the terrestrial network cells 212*a*, 212*b*, and 212*c* may cause interference 204*a*, 204*b*, and 204*c*, respectively, on the non-terrestrial network uplink transmission 206 received by the non-terrestrial network satellite 228.

Figure 3A:
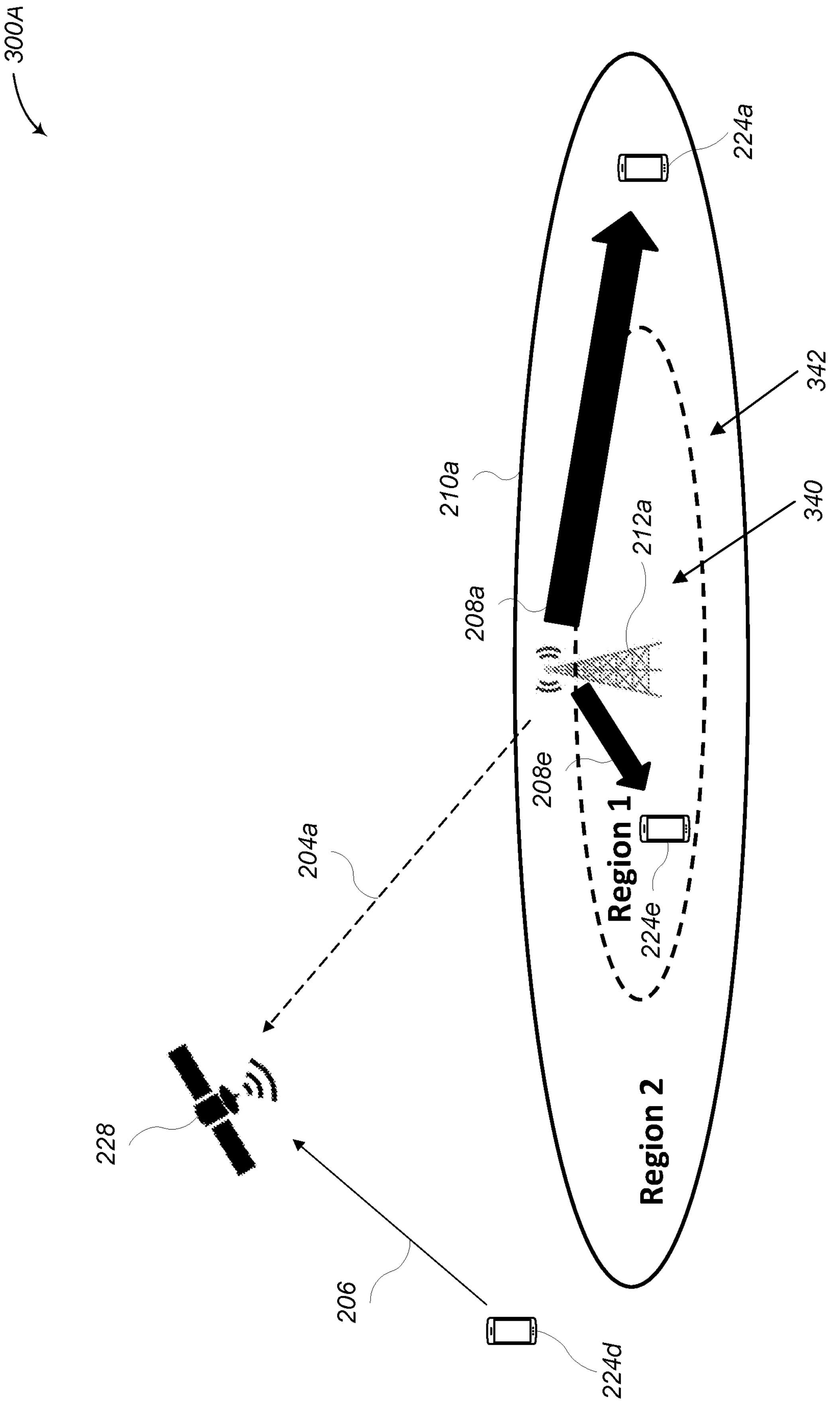
FIGS. 3A-3B are context diagrams of non-limiting example illustrations of techniques for mitigating the interference illustrated in FIG. 2 in accordance with embodiments described herein.
Figure 3B:
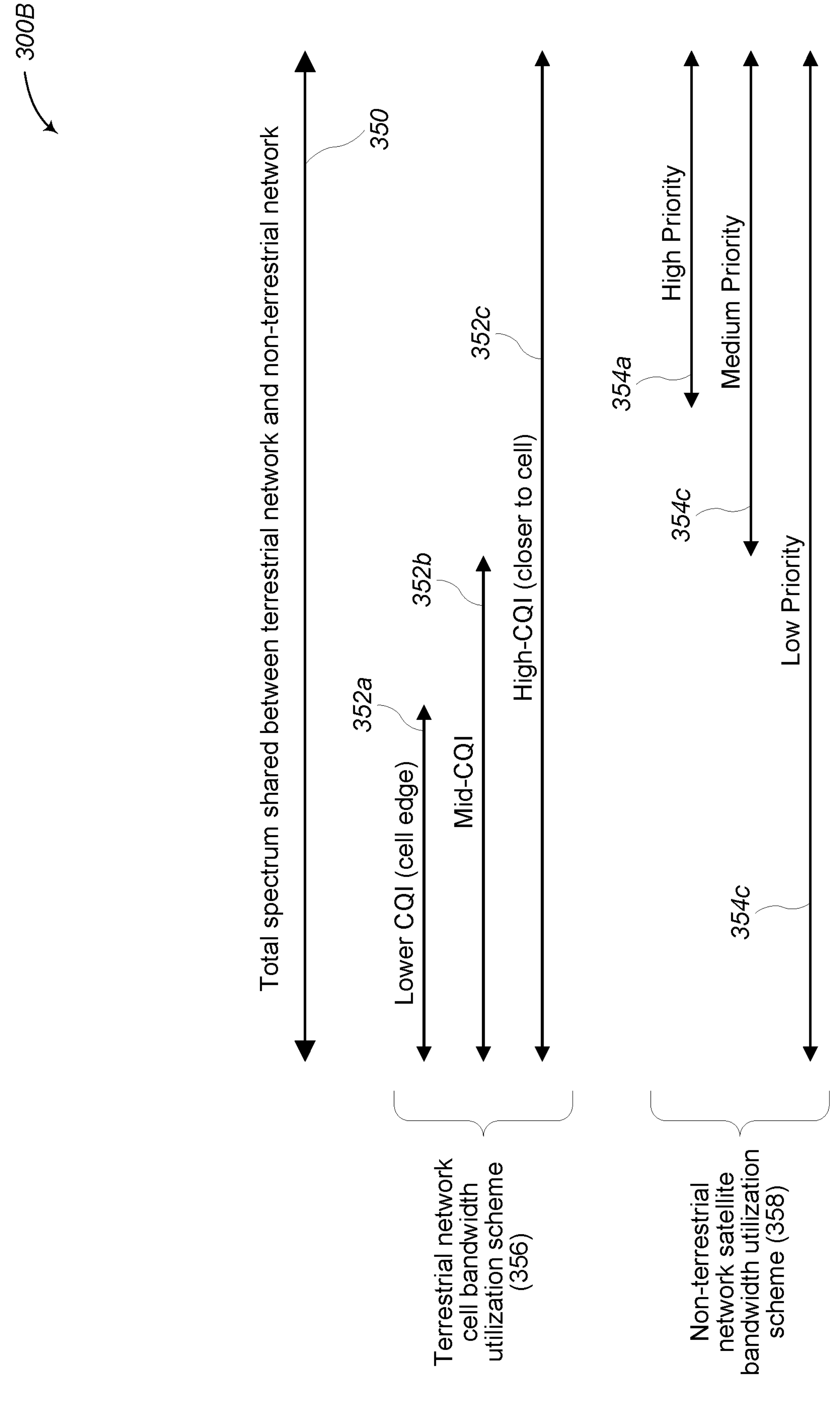

FIGS. 3A-3B are context diagrams of non-limiting example illustrations of techniques for mitigating the interference illustrated in FIG. 2 in accordance with embodiments described herein. Environment 300A in FIG. 3A is an embodiment of environment 200 in FIG. 2, but with only terrestrial network cell 212*a*, non-terrestrial network satellite 228, and user devices 224*a* and 224*e* being illustrated. Environment 300A also include user device 224*e*.

To reduce the terrestrial network downlink transmission interference 204*a* on the non-terrestrial network uplink transmissions 206, the coverage area 210*a* of the terrestrial network cell 212*a* is divided into multiple regions. In this illustration a first region 340 is closest to the terrestrial network cell 212*a* and a second region 342 is further away from the terrestrial network cell 212*a* compared to the first region 340. In some embodiments, the first region 340 may be referred to as an inner coverage area of the terrestrial network cell 212*a* and the second region 342 may be referred to as an outer coverage area of the terrestrial network cell 212*a*.

In some embodiments, the first region 340 and second region 342 may be defined as specific geographic areas relative to the terrestrial network cell 212*a*. In other embodiments, the first region 340 and second region 342 may be defined by other location or positioning indicators, such as ranges of CQIs. Although FIG. 3A illustrates two regions, embodiments are not so limited. For example, three or more regions may also be defined for separate bandwidth part select schemes.

By dividing the coverage area 210*a* into multiple regions 340 and 342, the terrestrial network cell 212 can utilize separate bandwidth utilization schemes for terrestrial network downlink transmissions to user devices 224*a* and 224*e*. For example, the terrestrial network cell 212*a* can utilize less transmit power for terrestrial network downlink transmission 208*e* to transmit data to user device 224*e*. But the terrestrial network cell 212*a* can select specific bandwidth parts (BWPs) for terrestrial network downlink transmission 208*a* to transmit data to user device 224*a*. Likewise, the non-terrestrial network satellite 228 can select specific bandwidth parts for non-terrestrial network uplink transmission 206 to receive data from user device 224*d*, where these specific bandwidth parts are selected in a different order than the specific bandwidth parts selected by the terrestrial network cell 212*a*, which is illustrated in FIG. 3B.

FIG. 3B illustrates bandwidth utilization schemes 300B. In particular, the terrestrial and non-terrestrial networks have a total bandwidth spectrum 350 available. Terrestrial network cells are instructed to utilize bandwidth utilization scheme 356, and non-terrestrial network satellite is instructed to utilize bandwidth utilization scheme 358.

When transmitting data to user devices within the outer region of a terrestrial cell's coverage area, i.e., terrestrial user devices having a low CQI, the terrestrial network cell can assign lower bandwidth parts 252*a* for terrestrial network downlink transmissions to those user devices based on the bandwidth utilization scheme 356. For user devices within the inner region of a terrestrial cell's coverage area, i.e., terrestrial user devices having a high CQI, the terrestrial network cell can assign all bandwidth parts 252*c* for terrestrial network downlink transmissions to those user devices based on the bandwidth utilization scheme 358, but transmit with lower transmit power. And for user devices having low-CQIs or mid-CQIs, the terrestrial network cell can assign lower and middle bandwidth parts 252*b* for terrestrial network downlink transmissions to those user devices.

Conversely, the non-terrestrial network satellite can assign bandwidth parts for non-terrestrial network uplink transmissions from non-terrestrial user devices based on the non-terrestrial network satellite bandwidth utilization scheme 358. For example, higher bandwidth parts 354*a* can be assigned for high priority data, higher and medium bandwidth parts 354*b* can be assigned for medium priority data, and all bandwidth parts 354*c* can be assigned for low priority data.

Although the non-terrestrial network satellite bandwidth utilization scheme illustrates higher bandwidth parts for high priority data and the terrestrial network cell bandwidth utilization scheme illustrates lower bandwidth parts for lower CQI user devices, embodiments are not so limited. For example, in some embodiments, the non-terrestrial network satellite bandwidth utilization scheme may utilize lower bandwidth parts for high priority data and the terrestrial network cell bandwidth utilization scheme may utilize higher bandwidth parts for lower CQI user devices.

In some embodiments, the bandwidth parts described throughout the description and figures may be one or more physical resource blocks (PRB), where each PRB is a section or band of frequency spectrum for a given amount of time (e.g., during a transmission time slot) that user devices or cells can utilize to transmit data to one another. The selection of specific bandwidth parts may also be referred to as a PRB allocation scheme or strategy to allocate specific PRBs.

The operation of certain aspects will now be described with respect to FIGS. 4-6.

Figure 4:
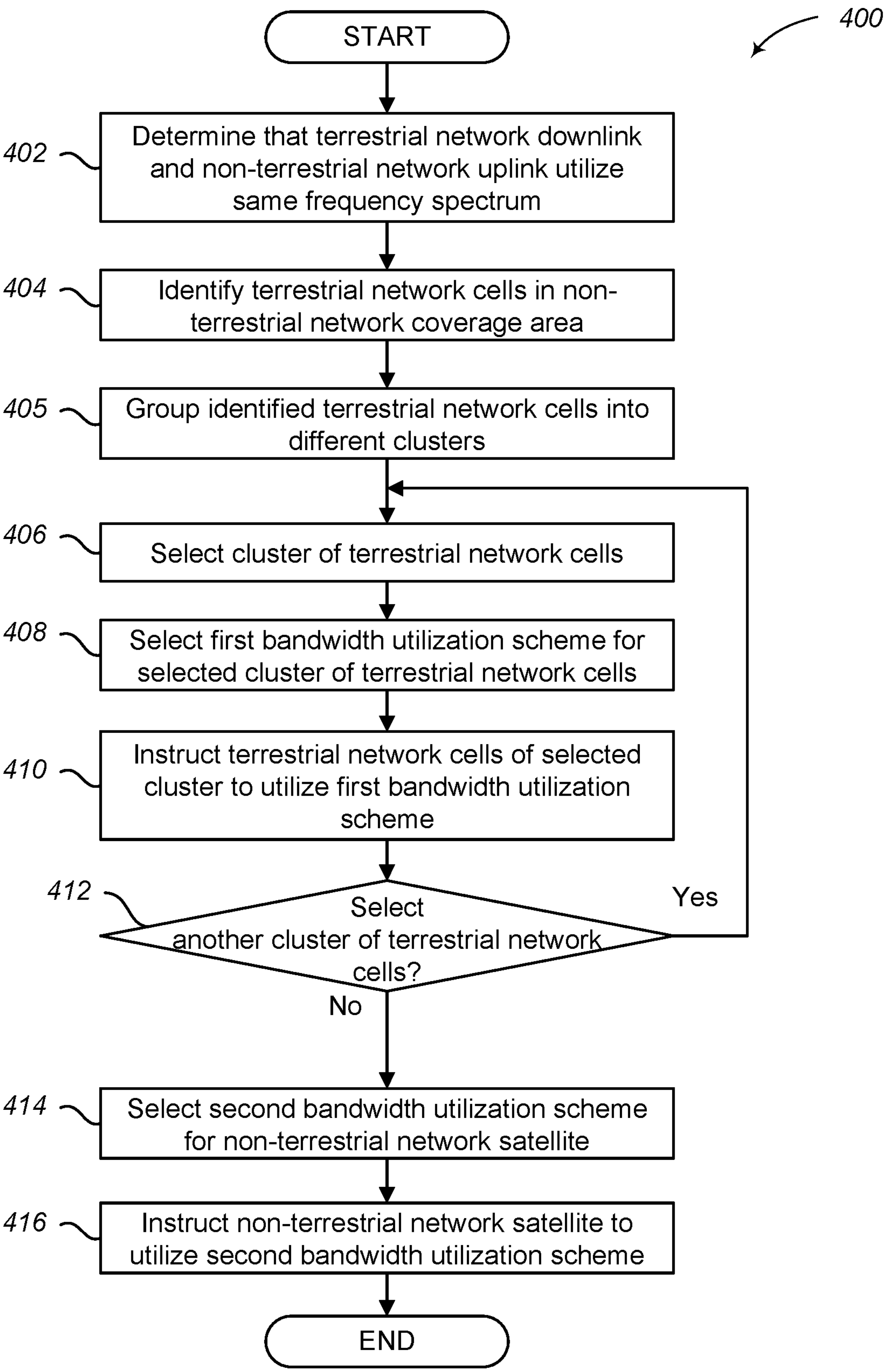
FIG. 4 illustrates a logical flow diagram showing one embodiment of a process for selecting bandwidth utilization schemes for non-terrestrial and terrestrial network cells to implement the mitigation techniques illustrated in FIGS. 3A-3B in accordance with embodiments described herein.

FIG. 4 illustrates a logical flow diagram showing one embodiment of a process 400 for selecting bandwidth utilization schemes for non-terrestrial and terrestrial network cells to implement the mitigation techniques illustrated in FIGS. 3A-3B in accordance with embodiments described herein. In at least one of various embodiments, process 400 may be implemented by or executed via circuitry or on one or more computing devices, such as terrestrial network and non-terrestrial network interference mitigation system 102 in FIG. 1, or one or more terrestrial or non-terrestrial cells.

Process 400 begins, after a start block, at block 402, where the system determines that terrestrial network downlink transmissions and non-terrestrial network uplink transmissions utilize a same frequency spectrum. In some embodiments, this determination is based on the capabilities of user devices being able to access both the terrestrial and non-terrestrial network using the same frequency spectrum. In other embodiments, this determination is based on the terrestrial and non-terrestrial networks attempting to communicate with user devices using the same frequency spectrum.

Process 400 proceeds after block 402 to block 404, where terrestrial network cells located within (or have a coverage area partially overlapping) a non-terrestrial network coverage area are identified. In some embodiments, the terrestrial network cells may be identified based on their geographic location and their known or expected coverage area (e.g., based on the antenna or radio hardware, height, etc.), which can then be compared to the known or expected coverage area of a non-terrestrial network satellite. If the coverage area of a terrestrial network cell at least partially overlaps the coverage area of the non-terrestrial network satellite, then that terrestrial network cell is identified.

Process 400 continues after block 404 at block 405, where the identified terrestrial network cells are grouped into a plurality of different clusters. In some embodiments, the terrestrial network cells may be grouped such that the coverage area of each terrestrial network cell in a cluster is adjacent to or partially overlaps the coverage area of at least one other terrestrial network cell in the same cluster. In other embodiments, the terrestrial network cells may be grouped such that the coverage area of each terrestrial network cell in a cluster is not adjacent to nor partially overlaps the coverage area of at least one other terrestrial network cell in the same cluster. In various embodiments, the number of identified terrestrial network cells in a cluster may be set or selected by an administrator.

Process 400 proceeds after block 405 to block 406, where a cluster of terrestrial network cells is selected. In various embodiments, each cluster is selected and processed such that a bandwidth utilization scheme is selected for each terrestrial network cell in each cluster.

Process 400 continues after block 406 at block 408, where a first bandwidth utilization scheme is selected for the selected cluster of terrestrial network cells. The first bandwidth utilization scheme defines which bandwidth parts the terrestrial network cells of that cluster are to utilize for terrestrial network downlink transmissions, which is described in more detail in conjunction with FIGS. 3A-3B and FIG. 5. In some embodiments, the first bandwidth utilization scheme also indicates how the terrestrial network cells in the cluster are to divide their coverage area into multiple regions.

In various embodiments, the first bandwidth utilization scheme may also schedule the SSBs (synchronization signal block) of the terrestrial network cells in selected cluster such that they are at different time-slots or in frequency domains from the terrestrial network cells in other clusters.

Process 400 proceeds next after block 408 to block 410, where terrestrial network cells of the selected cluster are instructed to utilize the first bandwidth utilization scheme. In some embodiments, each terrestrial network cell may store a plurality of different possible bandwidth utilization schemes. An indication of the first bandwidth utilization scheme is then transmitted to the terrestrial network cells, such that the terrestrial network cells can select the previously-stored bandwidth utilization scheme that matches the first bandwidth utilization scheme. In other embodiments, the details of the first bandwidth utilization scheme are transmitted to the terrestrial network cells.

Process 400 continues next after block 410 at decision block 412, where a determination is made whether another cluster of terrestrial network cells is selected. In various embodiments, each cluster is sequentially selected so that each cluster is selected. If another cluster of terrestrial network cells is to be selected, process 400 loops to block 406 to select another cluster; otherwise, process 400 flows to block 414.

At block 414, a second bandwidth utilization scheme is selected for the non-terrestrial network satellite. The second bandwidth utilization scheme defines which bandwidth parts the non-terrestrial network satellite is to utilize for non-terrestrial network uplink transmissions, which is described in more detail in conjunction with FIGS. 3A-3B and FIG. 6.

Process 400 proceeds after block 414 to block 416, where the non-terrestrial network satellite is instructed to utilize the second bandwidth utilization scheme. In some embodiments, the non-terrestrial network satellite may store a plurality of different possible bandwidth utilization schemes. An indication of the second bandwidth utilization scheme is then transmitted to the non-terrestrial network satellite, such that the non-terrestrial network satellite can select the previously-stored bandwidth utilization scheme that matches the second bandwidth utilization scheme. In other embodiments, the details of the second bandwidth utilization scheme are transmitted to the non-terrestrial network satellite.

After block 416, process 400 terminates or otherwise returns to a calling process to perform additional actions.

Figure 5:
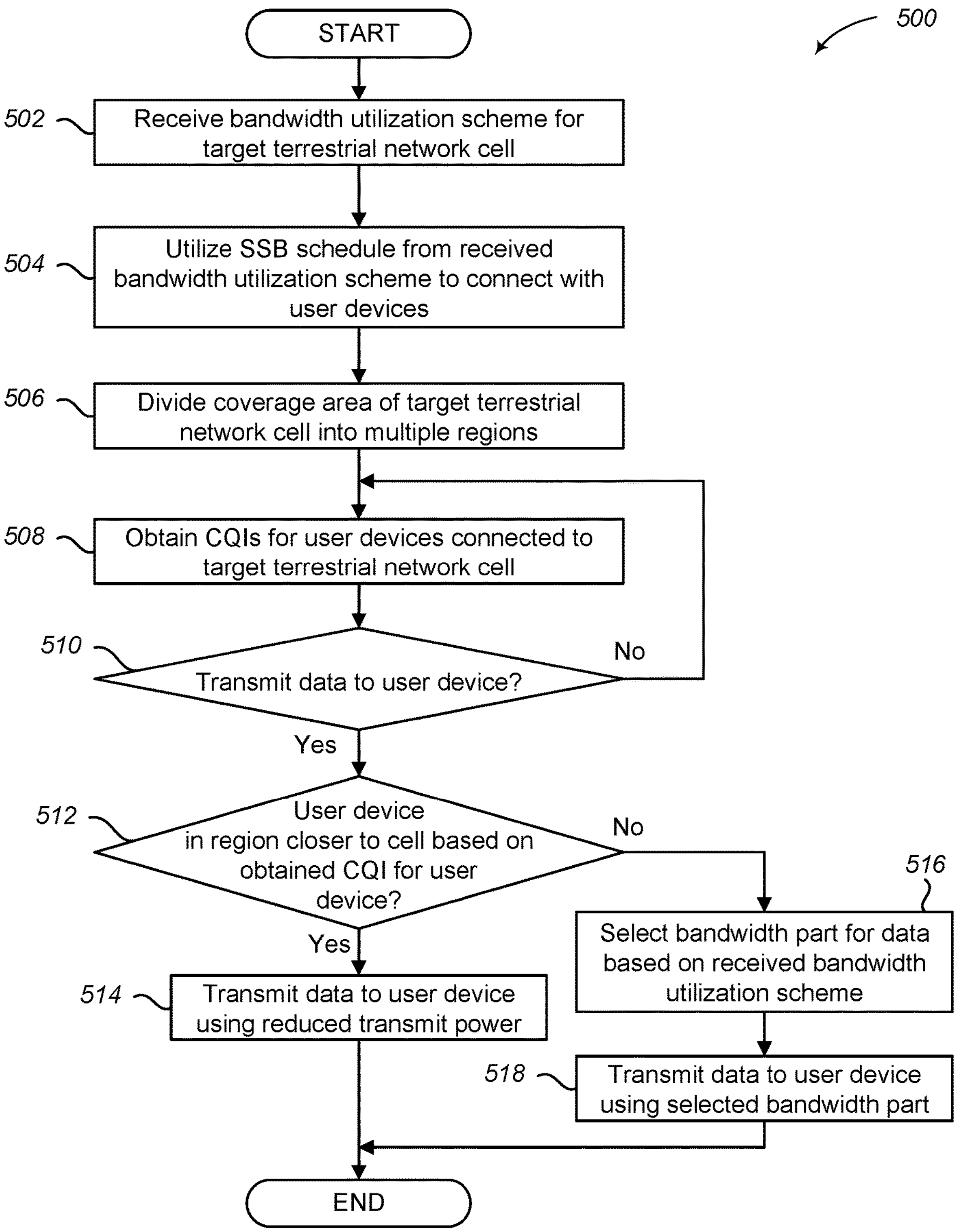
FIG. 5 illustrates a logical flow diagram showing one embodiment of a process for a terrestrial network cell to implement a bandwidth utilization scheme selected in FIG. 4 in accordance with embodiments described herein.

FIG. 5 illustrates a logical flow diagram showing one embodiment of a process 500 for a terrestrial network cell to implement a bandwidth utilization scheme selected in FIG. 4 in accordance with embodiments described herein. In at least one of various embodiments, process 500 may be implemented by or executed via circuitry or on one or more computing devices, such as terrestrial network cell 112 in FIG. 1.

Process 500 begins, after a start block, at block 502, where a bandwidth utilization scheme is received for the target terrestrial network cell to utilize for terrestrial network downlink transmissions. In various embodiments, this bandwidth utilization scheme is the first bandwidth utilization scheme that the target terrestrial network cell is instructed to use at block 410 in FIG. 4.

Process 500 proceeds after block 502 to block 504, where an SSB schedule is utilized to connect with user devices in the coverage area of the target terrestrial network cell. In various embodiments, the SSB schedule is defined in the received bandwidth utilization schedule.

Process 500 continues after block 504 at block 506, where the coverage area of the target terrestrial network cell is divided into a plurality of regions. As described herein, e.g., in FIG. 3A, the coverage area may be divided into an inner coverage area and an outer coverage area.

Process 500 proceeds next after block 506 at block 508, where CQIs (channel quality indicator) for user devices connected to the target terrestrial network cell are obtained. In at least one embodiment, the CQI data provides an indication of how far away the user devices are from the target terrestrial network cell. In other embodiments, other location/distance indicators, such as GPS or other location/positioning information, may be obtained from the user devices.

Process 500 continues next after block 508 to decision block 510, where a determination is made whether the target terrestrial network cell has data to transmit to a user device. If the target terrestrial network cell has data to transmit to the user device, then process 500 proceeds to decision block 512; otherwise, process 500 loops to block 508 to obtain additional CQIs (or other location/distance/positioning indicators or information) for user devices and to determine if the target terrestrial network cell has data to transmit to a user device.

At decision block 512, a determination is made whether the user device is located in a region closer to the target terrestrial network cell or a further away region based on the obtained CQI for that user device. In various embodiments, the CQI data, or other location/distance indicators (e.g., GPS or other location/positioning information), may be compared to the various regions of the coverage area of the target terrestrial network cell. If the user device is located in a region closer to the target terrestrial network cell, then process 500 flows to block 514; otherwise, process 500 flows to block 516.

At block 514, the target terrestrial network cell transmits data to the user device using reduced transmit power. In some embodiments, the level in which the transmit power is reduced may be determined by how far away the user device is from the target terrestrial network cell. In other embodiments, the reduced transmit power may be a selected or predetermined level. After block 514, process 500 terminates or otherwise returns to a calling process to perform other actions.

If, at decision block 512, the user device is not located in a region closer to the target terrestrial network cell, then process 500 flows from decision block 512 to block 516. At block 516, a bandwidth part is selected for the data transmission based on the received bandwidth utilization scheme. As discussed in FIG. 3B, different bandwidth parts may be utilized for transmitting data to user devices at various different distances away from the target terrestrial network cell.

Process 500 proceeds after block 516 at block 518, where the target terrestrial network cell transmits data to the user device using the selected bandwidth part. After block 518, process 500 terminates or otherwise returns to a calling process to perform other actions.

Although process 500 is illustrated as terminating or ending, embodiments are not so limited. In some embodiments, process 500 may loop after block 514 or block 518 to block 508 to obtain additional CQIs (or other location/distance/positioning indicators or information) for user devices and to determine if the target terrestrial network cell has data to transmit to a user device.

Moreover, in some embodiments, block 504 may be optional and may not be employed, or it may be employed separately. For example, process 500 may employ blocks 502, 506, 508, 510, 512, 514, 516, and 518 to utilize separate bandwidth parts without utilizing the SSB scheduling. In other embodiments, process 500 may employ blocks 502 and 504 alone without the other illustrated blocks. In this way, SSB scheduling of different terrestrial network cells at different timeslots can be utilized to prevent the SSBs from those terrestrial network cells appearing at the same time and combining to create a higher interference for the non-terrestrial network satellite. Thus, the SSB scheduling and the bandwidth utilization (BWP) management described in FIG. 5 may be performed together or independent from one another.

Figure 6:
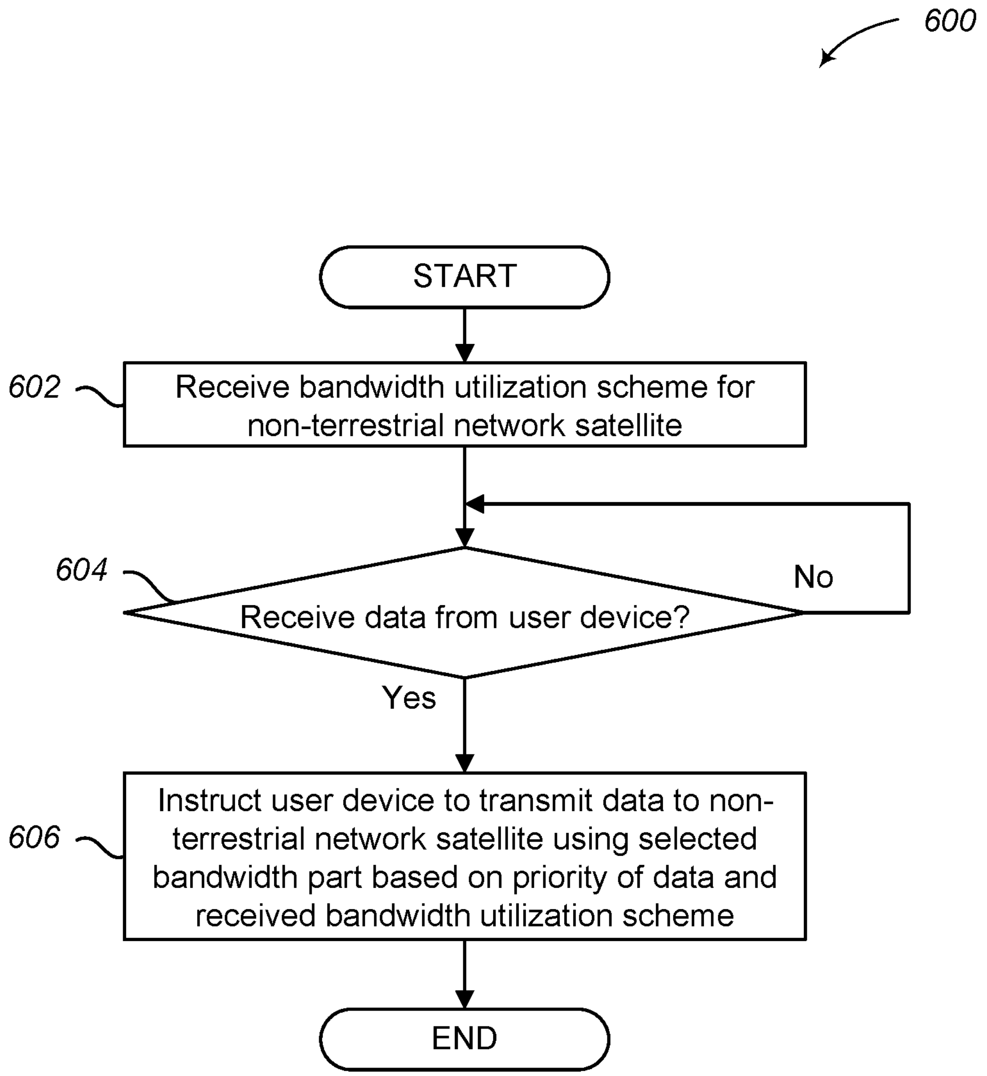
FIG. 6 illustrates a logical flow diagram showing one embodiment of a process for a non-terrestrial network satellite to implement a bandwidth utilization scheme selected in FIG. 4 in accordance with embodiments described herein.

FIG. 6 illustrates a logical flow diagram showing one embodiment of a process 600 for a non-terrestrial network satellite to implement a bandwidth utilization scheme selected in FIG. 4 in accordance with embodiments described herein. In at least one of various embodiments, process 600 may be implemented by or executed via circuitry or on one or more computing devices, such as non-terrestrial network satellite 128 in FIG. 1.

Process 600 begins, after a start block, at block 602, where a bandwidth utilization scheme is received for the non-terrestrial network satellite to utilize for non-terrestrial network uplink transmissions. In various embodiments, this bandwidth utilization scheme is the second bandwidth utilization scheme that the non-terrestrial network satellite is instructed to use at block 416 in FIG. 4

Process 600 proceeds after block 602 at decision block 604, where a determination is made whether the non-terrestrial network satellite is to receive data from a user device. If the non-terrestrial network satellite is to receive communications or data from a user device, then process 600 flows to block 606; otherwise, process 600 loops to decision block 604 to wait until the non-terrestrial network satellite is to receive data from a user device.

At block 606, the non-terrestrial network satellite instructs the user device to transmit the data to the non-terrestrial network satellite using selected bandwidth parts abased on a priority of the data and the received bandwidth utilization scheme. As discussed in FIG. 3B, the user device may transmit to the non-terrestrial network satellite high priority data using a high bandwidth parts, medium priority using high and middle bandwidth parts, and low priority data using any bandwidth part.

After block 606, process 600 terminates or otherwise returns to a calling process to perform other actions. Although process 600 is illustrated as terminating or ending, embodiments are not so limited. In some embodiments, process 600 may loop after block 606 to decision block 604 determine additional data is to be received from the user device or if data is to be received from another user device.

Figure 7:
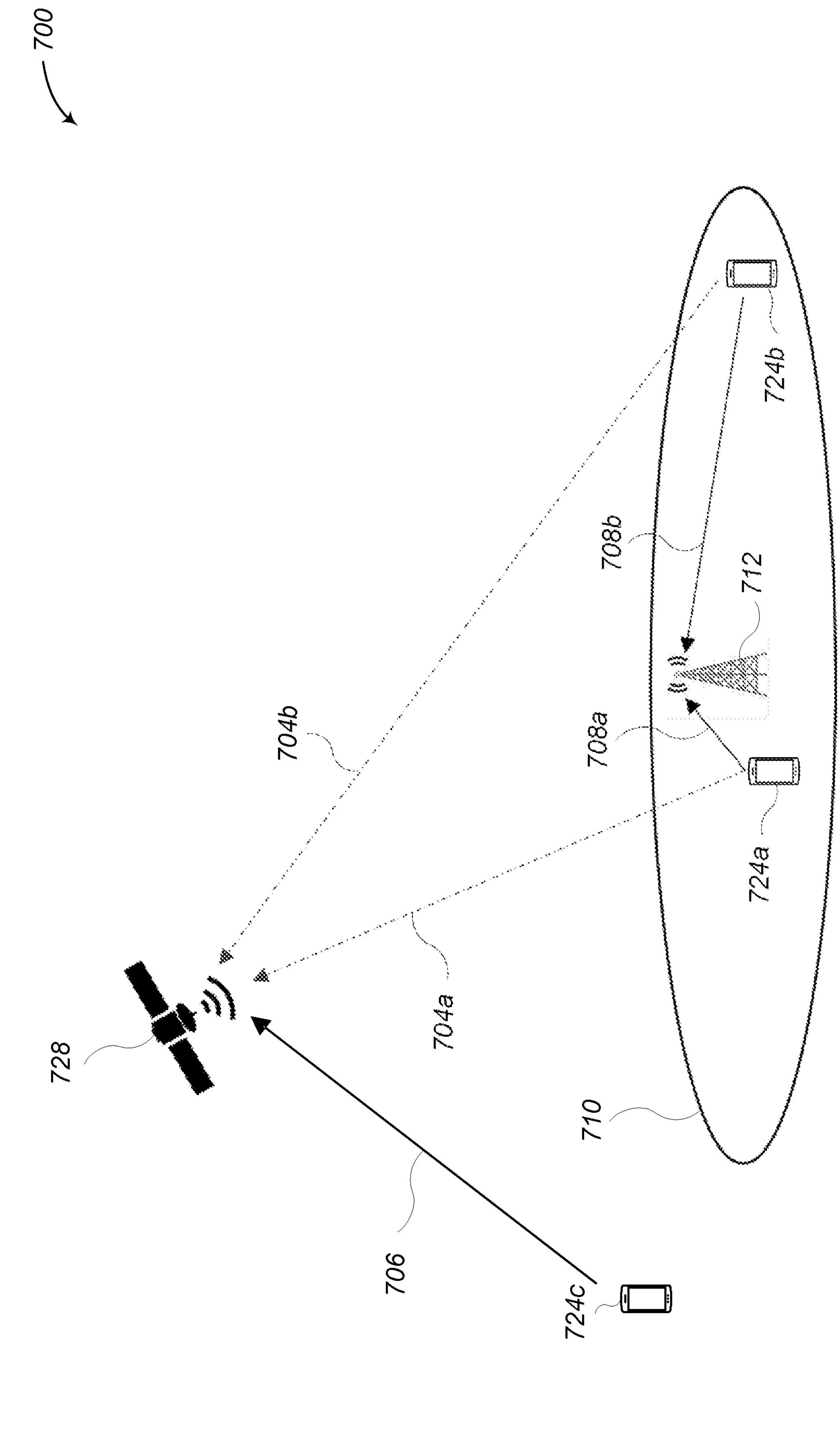
FIG. 7 is a context diagram of a non-limiting example illustration of an environment with terrestrial network uplink transmission interference on non-terrestrial network uplink transmissions in accordance with embodiments described herein.

FIG. 7 is a context diagram of a non-limiting example illustration of an environment 700 with terrestrial network uplink transmission interference on non-terrestrial network uplink transmissions in accordance with embodiments described herein.

Environment 700 includes a non-terrestrial network satellite 728, a terrestrial network cell 712, and user devices 724*a*-724*c*, which may be embodiments, of the non-terrestrial network satellite 128, the terrestrial network cells 112*a*-112*c*, and the user devices 124*a*-124*c* in FIG. 1, respectively. These elements are given separate reference numbers for ease of illustration. The terrestrial network cell 712 has a coverage area 710, which at least partially overlap the coverage area (not illustrated) of the non-terrestrial network satellite 728.

In this illustration, the terrestrial network cell 712 is utilizing non-terrestrial network uplink transmissions 708*a*-708*b* to receive data from user device 724*a*-724*b*. These terrestrial network uplink transmissions may cause interference 704*a* and 707*b* on non-terrestrial network uplink transmissions 706 received by the non-terrestrial network satellite 728 from user device 724*c*.

Figure 8A:
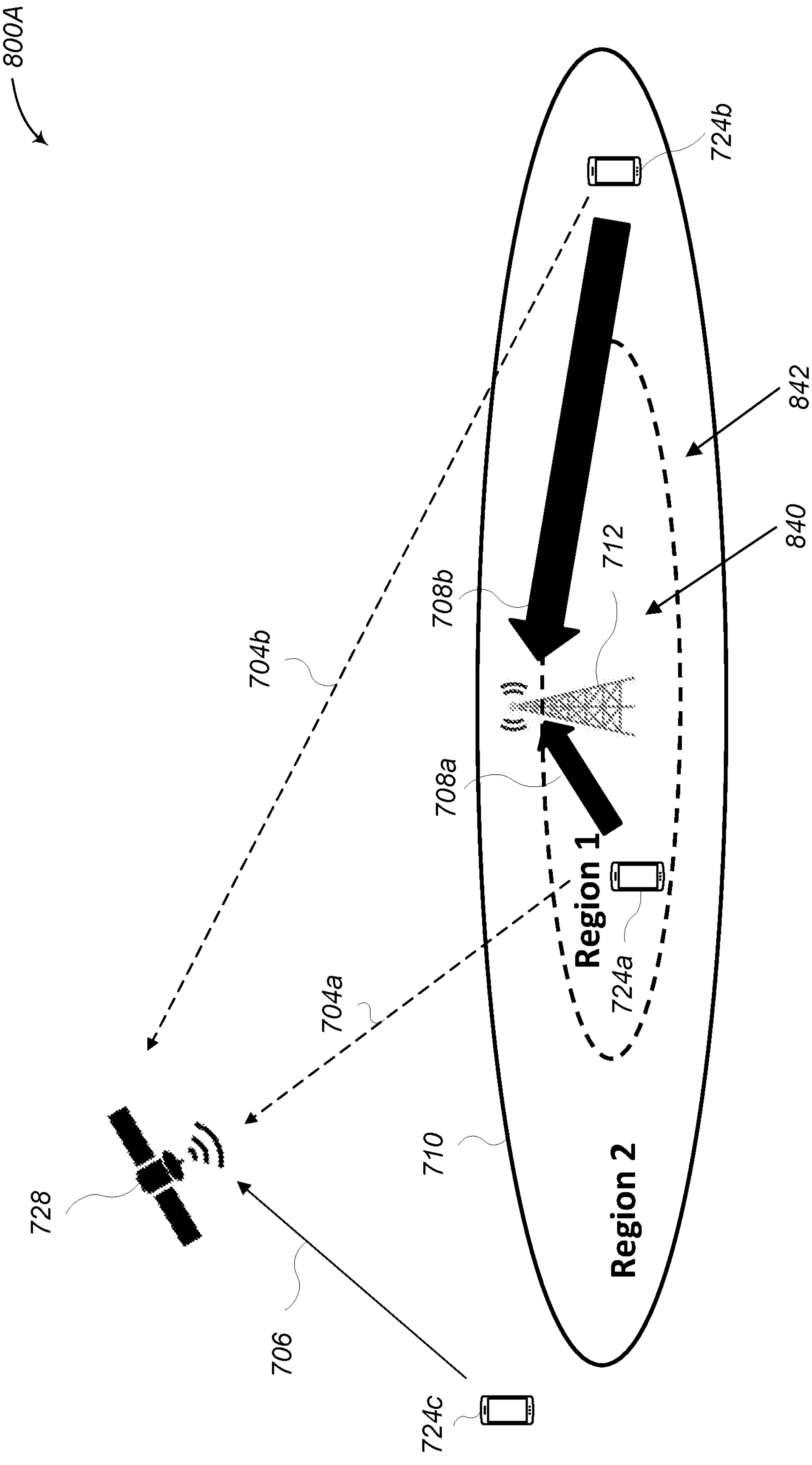
FIGS. 8A-8B are context diagrams of non-limiting example illustrations of techniques for mitigating the interference illustrated in FIG. 7 in accordance with embodiments described herein.
Figure 8B:
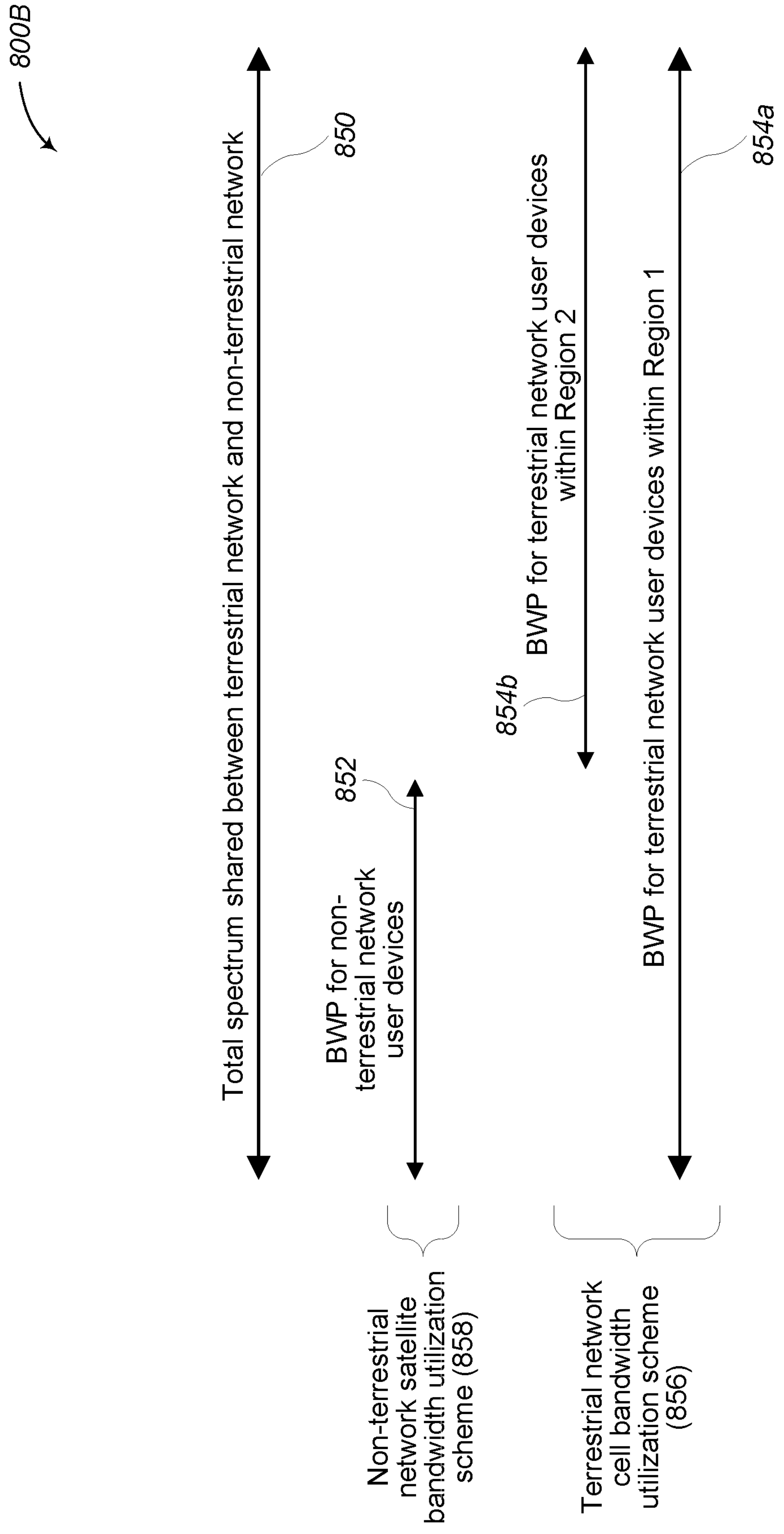

FIGS. 8A-8B are context diagrams of non-limiting example illustrations of techniques for mitigating the interference illustrated in FIG. 7 in accordance with embodiments described herein. Environment 800A in FIG. 8A is an embodiment of environment 700 in FIG. 7.

To reduce the terrestrial network uplink transmission interference 704*a* and 704*b* on the non-terrestrial network uplink transmissions 706, the coverage area 710 of the terrestrial network cell 712 is divided into multiple regions. In this illustration a first region 840 is closest to the tower (or antenna) of the terrestrial network cell 712 and a second region 842 is further away from the down (or antenna) of the terrestrial network cell 712 compared to the first region 840. In some embodiments, the first region 840 may be referred to as an inner coverage area of the terrestrial network cell 712 and the second region 842 may be referred to as an outer coverage area of the terrestrial network cell 712. In some embodiments, the first region 840 and the second region 842 may cover the same or similar areas to the first region 340 and the second region 342 in FIG. 3A. In other embodiments, the first region 840 and the second region 842 may cover different areas from the first region 340 and the second region 342 in FIG. 3A.

In some embodiments, the first region 840 and second region 842 may be defined as specific geographic areas relative to the tower or antenna of the terrestrial network cell 712. In other embodiments, the first region 840 and second region 842 may be defined by other location or positioning indicators, such as ranges of CQIs. Although FIG. 8A illustrates two regions, embodiments are not so limited. For example, three or more regions may also be defined for separate bandwidth part select schemes.

By dividing the coverage area 710 into multiple regions 840 and 842, the terrestrial network cell 712 can utilize separate bandwidth utilization schemes for terrestrial network uplink transmissions from user devices 724*a* and 724*b*. For example, the terrestrial network cell 712 can instruct user device 724*a* in the first region 840 to use all available bandwidth parts for terrestrial network uplink transmission 708*a*. But the terrestrial network cell 712 can instruct user device 724*b* in the second region 842 to use specific bandwidth parts (BWPs) for terrestrial network uplink transmissions 708*b*. Likewise, the non-terrestrial network satellite 228 can instruct non-terrestrial user device 724*c* to use specific bandwidth parts for non-terrestrial network uplink transmission 706 to receive data from user device 724*c*, where these specific bandwidth parts are selected in a different order than the specific bandwidth parts selected by the terrestrial network cell 712, which is illustrated in FIG. 8B.

FIG. 8B illustrates bandwidth utilization schemes 800B. In particular, the terrestrial and non-terrestrial networks have a total bandwidth spectrum 850 available. Terrestrial network cells are instructed to utilize bandwidth utilization scheme 856, and non-terrestrial network satellite is instructed to utilize bandwidth utilization scheme 858.

When communicating with user devices within the outer region of a terrestrial cell's coverage area, e.g., terrestrial user devices having a low CQI, the terrestrial network cell can instruct those user devices to use higher bandwidth parts 852*b* for terrestrial network uplink transmissions based on the bandwidth utilization scheme 856. For user devices within the inner region of a terrestrial cell's coverage area, e.g., terrestrial user devices having a high CQI, the terrestrial network cell can instruct those user devices to use all available bandwidth parts 252*a* for terrestrial network uplink transmissions based on the bandwidth utilization scheme 858.

Conversely, the non-terrestrial network satellite can instruct non-terrestrial user devices to use lower bandwidth parts for non-terrestrial network uplink transmissions based on the non-terrestrial network satellite bandwidth utilization scheme 358.

Although the non-terrestrial network satellite bandwidth utilization scheme illustrates lower bandwidth parts for non-terrestrial user devices and the terrestrial network cell bandwidth utilization scheme illustrates higher bandwidth parts for lower CQI user devices, embodiments are not so limited. For example, in some embodiments, the non-terrestrial network satellite bandwidth utilization scheme may utilize higher bandwidth parts for non-terrestrial user devices and the terrestrial network cell bandwidth utilization scheme may utilize lower bandwidth parts for lower CQI user devices.

The operation of certain aspects will now be described with respect to FIGS. 9-10.

Figure 9:
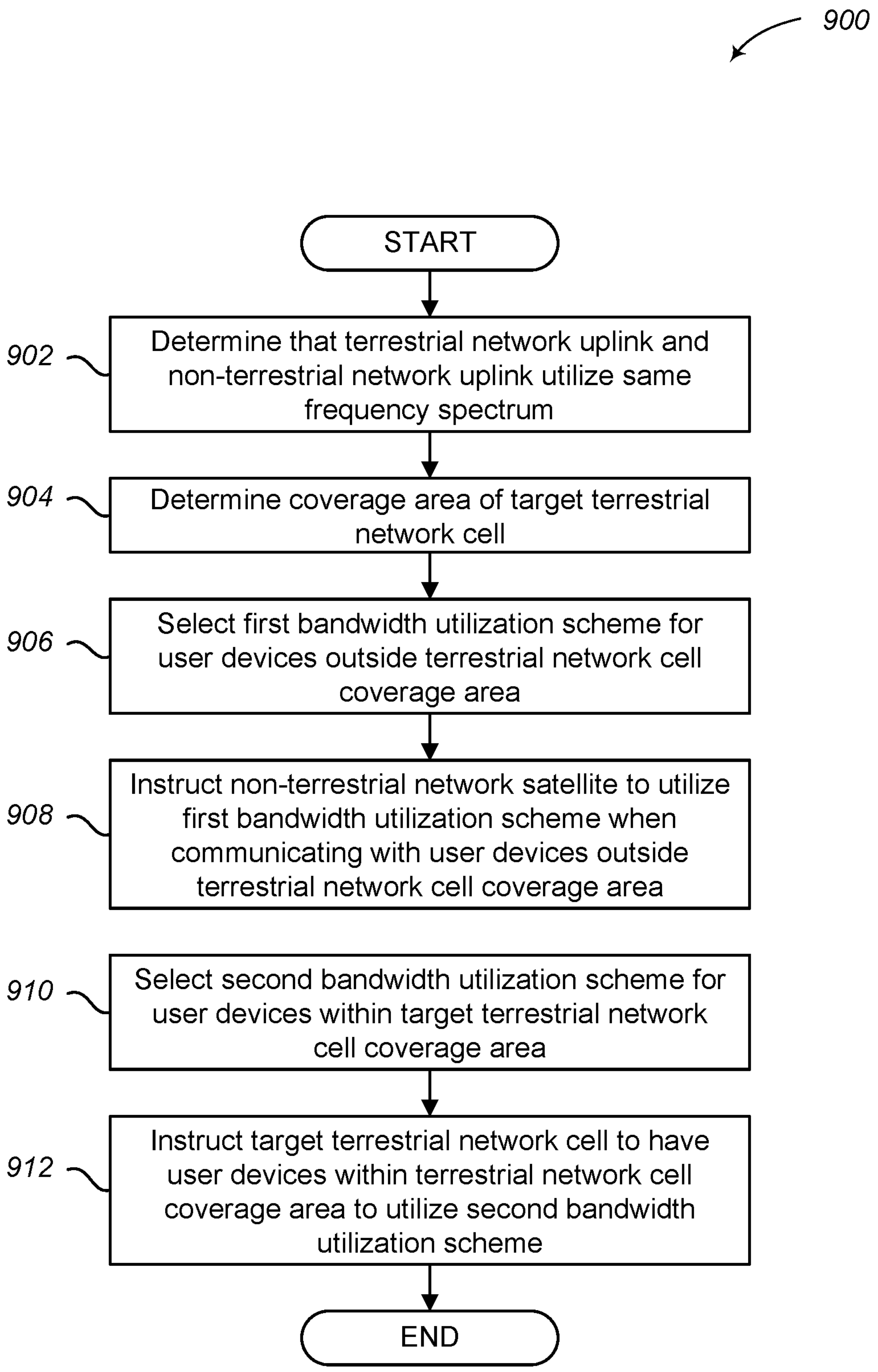
FIG. 9 illustrates a logical flow diagram showing one embodiment of a process for selecting bandwidth utilization schemes for non-terrestrial and terrestrial network cells to implement the mitigation techniques illustrated in FIGS. 8A-8B in accordance with embodiments described herein.

FIG. 9 illustrates a logical flow diagram showing one embodiment of a process 900 for selecting bandwidth utilization schemes for non-terrestrial and terrestrial network cells to implement the mitigation techniques illustrated in FIGS. 8A-8B in accordance with embodiments described herein. In at least one of various embodiments, process 900 may be implemented by or executed via circuitry or on one or more computing devices, such as terrestrial network and non-terrestrial network interference mitigation system 102 in FIG. 1, or one or more terrestrial or non-terrestrial cells.

Process 900 begins, after a start block, at block 902, where the system determines that terrestrial network uplink transmissions and non-terrestrial network uplink transmissions utilize a same frequency spectrum. In some embodiments, this determination is based on the capabilities of user devices being able to access both the terrestrial and non-terrestrial network using the same frequency spectrum. In other embodiments, this determination is based on the terrestrial and non-terrestrial networks attempting to communicate with user devices using the same frequency spectrum.

Process 900 proceeds after block 902 at block 904, where a coverage area of a target terrestrial network cell is determined. In some embodiments, the coverage area may be known or estimated based on the capabilities of the terrestrial network cell hardware. In other embodiments, an administrator may set or define the coverage area of the target terrestrial network cell.

Process 900 continues after block 904 to block 906, where a first bandwidth utilization scheme is selected for user devices outside the terrestrial network cell coverage area. This first bandwidth utilization scheme is selected for non-terrestrial network uplink transmissions from non-terrestrial user devices. The first bandwidth utilization scheme defines which bandwidth parts the non-terrestrial user devices are to utilize for non-terrestrial network uplink transmissions to a non-terrestrial network satellite, which is described in more detail in conjunction with FIGS. 8A-8B.

Process 900 proceeds after block 906 to block 908, where the non-terrestrial network satellite is instructed to utilize the first bandwidth utilization scheme. In some embodiments, the non-terrestrial network satellite forwards, or otherwise communicates, the first bandwidth utilization scheme to the non-terrestrial user devices. In other embodiments, the non-terrestrial network satellite informs the non-terrestrial user devices which bandwidth parts to use for non-terrestrial network uplink transmissions. In various embodiments, the non-terrestrial user devices may store a plurality of different possible bandwidth utilization schemes. The non-terrestrial network satellite can then transmit an indication of the first bandwidth utilization scheme to the non-terrestrial user devices.

Process 900 continues after block 908 at block 910, where a second bandwidth utilization scheme is selected for user devices within the target terrestrial network cell coverage area. The second bandwidth utilization scheme defines which bandwidth parts the terrestrial user devices are to utilize for terrestrial network uplink transmissions, which is described in more detail in conjunction with FIGS. 8A-8B and FIG. 10. In some embodiments, the second bandwidth utilization scheme also indicates how the target terrestrial network cell is to divide its coverage area into multiple regions.

Process 900 proceeds after block 910 to block 912, where the target terrestrial network cell is instructed to utilize the second bandwidth utilization scheme. In some embodiments, the terrestrial network cell forwards, or otherwise communicates, the second bandwidth utilization scheme to the terrestrial user devices. In other embodiments, the terrestrial network cell informs the terrestrial user devices which bandwidth parts to use for terrestrial network uplink transmissions. In various embodiments, the terrestrial user devices may store a plurality of different possible bandwidth utilization schemes. The terrestrial network cell can then transmit an indication of the second bandwidth utilization scheme to the terrestrial user devices.

After block 912, process 900 terminates or otherwise returns to a calling process to perform additional actions.

Figure 10:
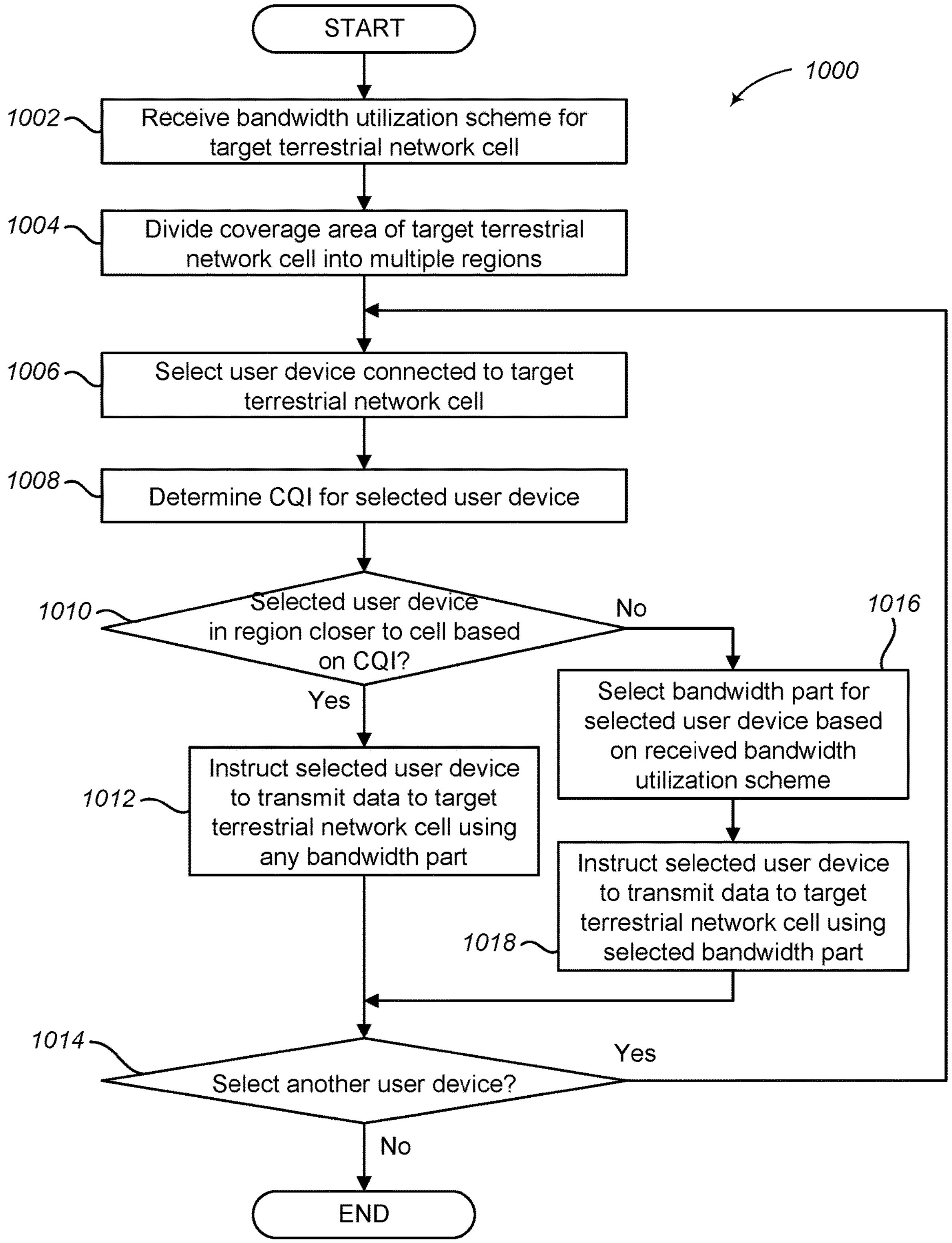
FIG. 10 illustrates a logical flow diagram showing one embodiment of a process for a terrestrial network cell to implement a bandwidth utilization scheme selected in FIG. 9 in accordance with embodiments described herein.

FIG. 10 illustrates a logical flow diagram showing one embodiment of a process 1000 for a terrestrial network cell to implement a bandwidth utilization scheme selected in FIG. 9 in accordance with embodiments described herein. In at least one of various embodiments, process 1000 may be implemented by or executed via circuitry or on one or more computing devices, such as terrestrial network cell 112 in FIG. 1.

Process 1000 begins, after a start block, at block 1002, where a bandwidth utilization scheme is received for the target terrestrial network cell to utilize for terrestrial network uplink transmissions from terrestrial user devices. In various embodiments, this bandwidth utilization scheme is the second bandwidth utilization scheme that the target terrestrial network cell is instructed to use at block 912 in FIG. 9.

Process 1000 proceeds after block 1002 to block 1004, where the coverage area of the target terrestrial network cell is divided into a plurality of regions. As described herein, e.g., in FIG. 8A, the coverage area may be divided into an inner coverage area and an outer coverage area.

Process 1000 continues after block 1004 at block 1006, where a terrestrial user device connected to the target terrestrial network cell is selected. In various embodiments, each terrestrial user device connected to the target terrestrial network cell is sequentially selected and instructed which bandwidth part to us for terrestrial network uplink transmissions.

Process 1000 proceeds next after block 1006 at block 1008, where CQIs (channel quality indicator) for user devices connected to the target terrestrial network cell are obtained. In various embodiments, block 1008 may employ embodiments of block 508 in FIG. 5 to obtain CQI data from terrestrial user devices. Similar to block 508, other location/distance indicators, such as GPS or other location/positioning information, may be obtained from the user devices.

Process 1000 continues next after block 1008 to decision block 1010, where a determination is made whether the selected user device is located in a region closer to the target terrestrial network cell or a further away region based on the obtained CQI (or other location/distance indicators) for that user device. In various embodiments, the CQI data, or other location/positioning information, may be compared to the various regions of the coverage area of the target terrestrial network cell. If the selected user device is located in a region closer to the target terrestrial network cell, then process 1000 flows to block 1012; otherwise, process 1000 flows to block 1016.

At block 1012, the target terrestrial network cell transmits instructs the selected user device to transmit data to the target terrestrial cell using any available bandwidth part. After block 1012, process 1000 flows to decision block 1014.

If, at decision block 1010, the selected user device is not located in a region closer to the target terrestrial network cell, then process 1000 flows from decision block 1010 to block 1016. At block 1016, a bandwidth part is selected for the user device to use for terrestrial network uplink transmission based on the received bandwidth utilization scheme, as illustrated in FIG. 8B.

Process 1000 proceeds after block 1016 at block 1018, where the target terrestrial network cell instructs the selected user device to transmit data to the target terrestrial network cell using the selected bandwidth part. After block 1018, process 1000 flows to decision block 1014.

At decision block 1014, a determination is made whether another user device is selected. In various embodiments, each terrestrial user device connected to the target terrestrial network cell is selected an instructed on which bandwidth parts to use for terrestrial network uplink transmissions. If another user device is to be selected, process 1000 loops to block 1006; otherwise, process 1000 terminates or otherwise returns to a calling process to perform other actions.

Although process 1000 is illustrated as terminating or ending, embodiments are not so limited. In some embodiments, process 1000 may continually loop to block 1006 to select terrestrial user devices as new devices enter the coverage area of the target terrestrial network cell.

Figure 11:
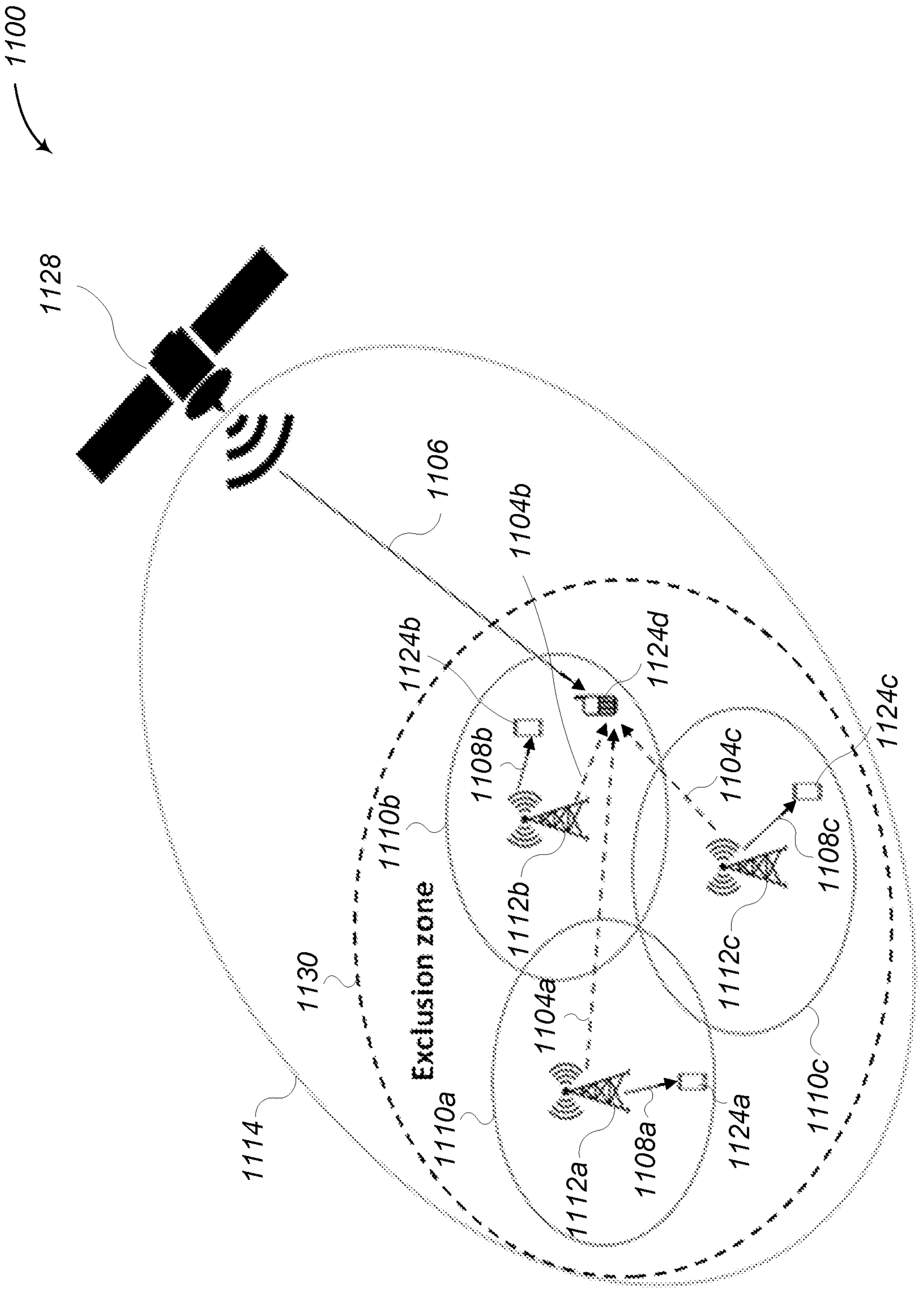
FIG. 11 is a context diagram of a non-limiting example illustration of an environment with terrestrial network downlink transmission interference on non-terrestrial network downlink transmissions in accordance with embodiments described herein.

FIG. 11 is a context diagram of a non-limiting example illustration of an environment 11 with terrestrial network downlink transmission interference on non-terrestrial network downlink transmissions in accordance with embodiments described herein;

Environment 1100 includes a non-terrestrial network satellite 1128, terrestrial network cells 1112*a*-1112*c*, and user devices 1124*a*-1124*d*, which may be embodiments, of the non-terrestrial network satellite 128, the terrestrial network cells 112*a*-112*c*, and the user devices 124*a*-124*c* in FIG. 1, respectively. These elements are given separate reference numbers for ease of illustration. The terrestrial network cells 1112*a*-1112*c* have respective coverage areas 1110*a*-1110*c*, which at least partially overlap the coverage area 1114 of the non-terrestrial network satellite 1128.

In this illustration, the non-terrestrial network satellite 1128 is utilizing non-terrestrial network downlink transmission 1106 to transmit data to user device 1124*d*. And the terrestrial network cells 1112*a*, 1112*b*, and 1112*c* are utilizing terrestrial network downlink transmissions 1108*a*, 1108*b*, and 1108*c* to transmit data to user devices 1124*a*, 1124*b*, and 1124*c*, respectively. These terrestrial network downlink transmissions utilized by the terrestrial network cells 1112*a*, 1112*b*, and 1112*c* may cause interference 1104*a*, 1104*b*, and 1104*c*, respectively, on the non-terrestrial network downlink transmission 1106 transmitted by the non-terrestrial network satellite 1128 to the user device 1124*d*. In this situation, an exclusion zone 1130 is generated or defined to mitigate the interference.

Figure 12:
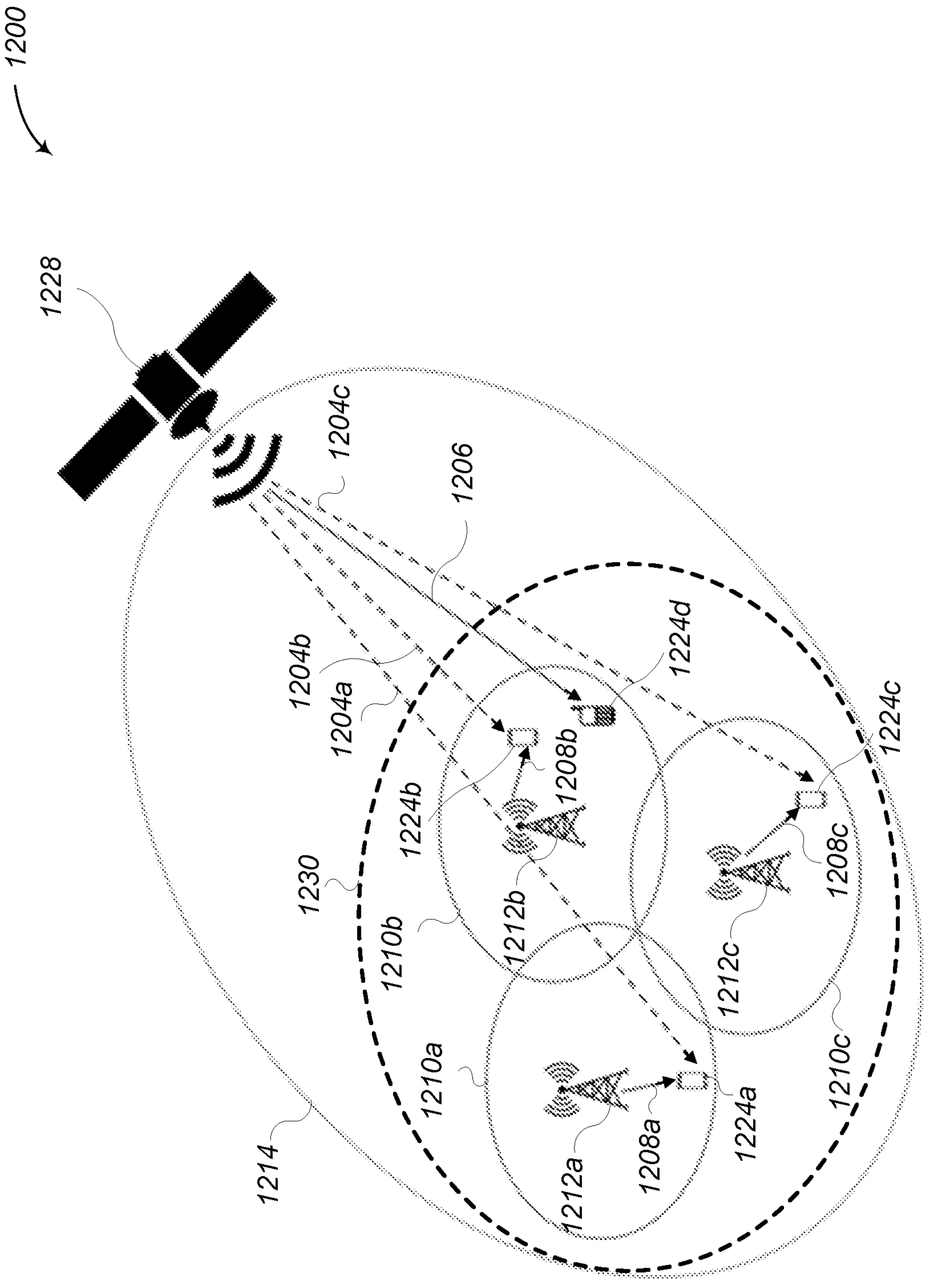
FIG. 12 is a context diagram of a non-limiting example illustration of an environment with non-terrestrial network downlink transmission interference on terrestrial network downlink transmissions in accordance with embodiments described herein.

FIG. 12 is a context diagram of a non-limiting example illustration of an environment 1200 with non-terrestrial network downlink transmission interference on terrestrial network downlink transmissions in accordance with embodiments described herein. Environment 1200 may be similar to environment 1100 in FIG. 11, but with different interference implications.

Environment 1200 includes a non-terrestrial network satellite 1228, terrestrial network cells 1212*a*-1212*c*, and user devices 1224*a*-1224*d*, which may be embodiments, of the non-terrestrial network satellite 128, the terrestrial network cells 112*a*-112*c*, and the user devices 124*a*-124*c* in FIG. 1, respectively. These elements are given separate reference numbers for ease of illustration. The terrestrial network cells 1212*a*-1212*c* have respective coverage areas 1210*a*-1210*c*, which at least partially overlap the coverage area 1214 of the non-terrestrial network satellite 1228.

In this illustration, the non-terrestrial network satellite 1228 is utilizing non-terrestrial network downlink transmission 1206 to transmit data to user device 1224*d*. And the terrestrial network cells 1212*a*, 1212*b*, and 1212*c* are utilizing terrestrial network downlink transmissions 1208*a*, 1208*b*, and 1208*c* to transmit data to user devices 1224*a*, 1224*b*, and 1224*c*, respectively. The non-terrestrial network downlink transmission utilized by the non-terrestrial network satellite 1228 may cause interference 1204*a*, 1204*b*, and 1204*c*, respectively, on the terrestrial network downlink transmissions transmitted by the terrestrial network cells 1212*a*-1212*c* to the user devices 1212*a*-1212*c*.

Figure 13A:
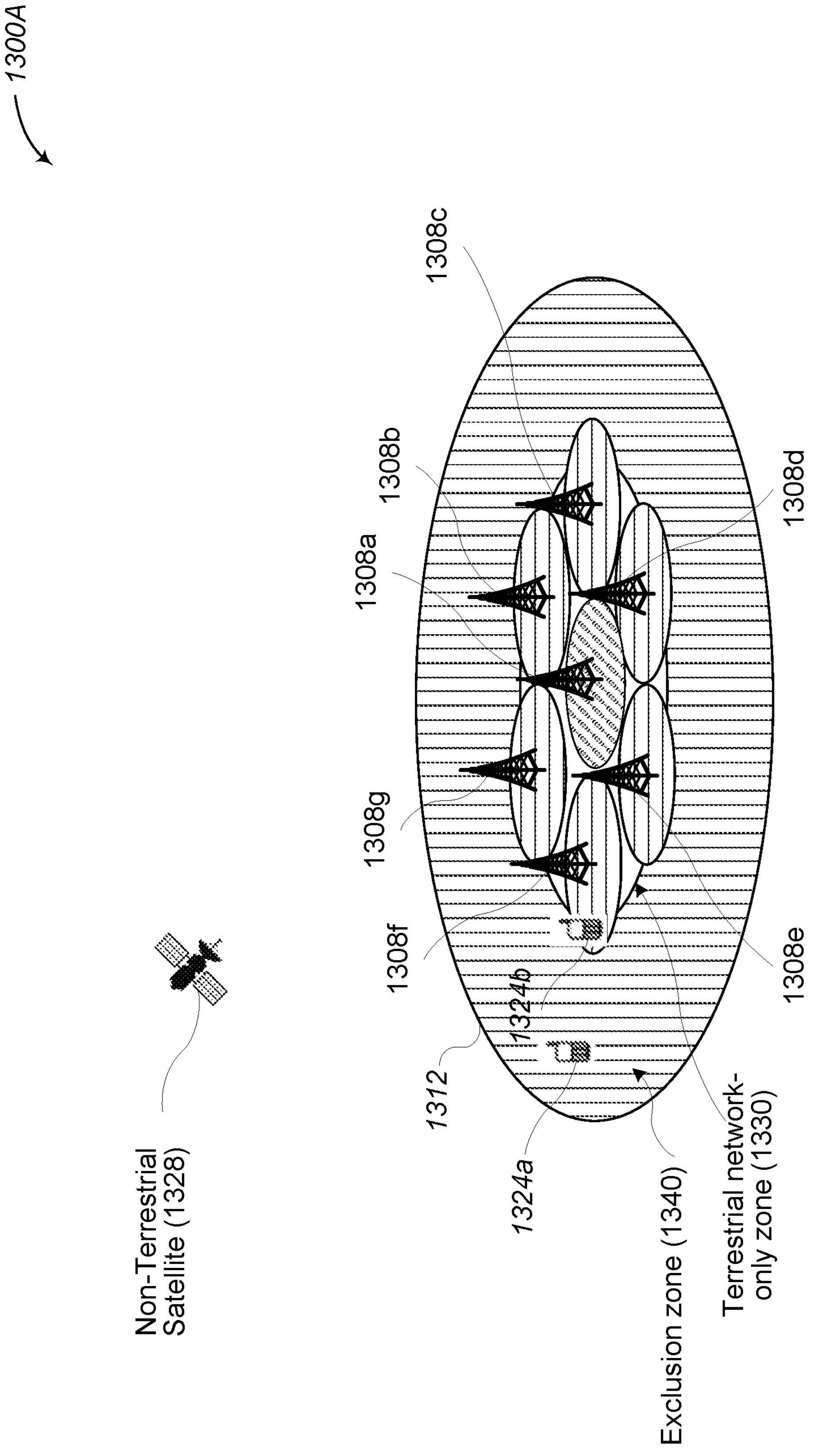
FIGS. 13A-13B are context diagrams of non-limiting example illustrations of techniques for mitigating the interference illustrated in FIGS. 11-12 in accordance with embodiments described herein.
Figure 13B:
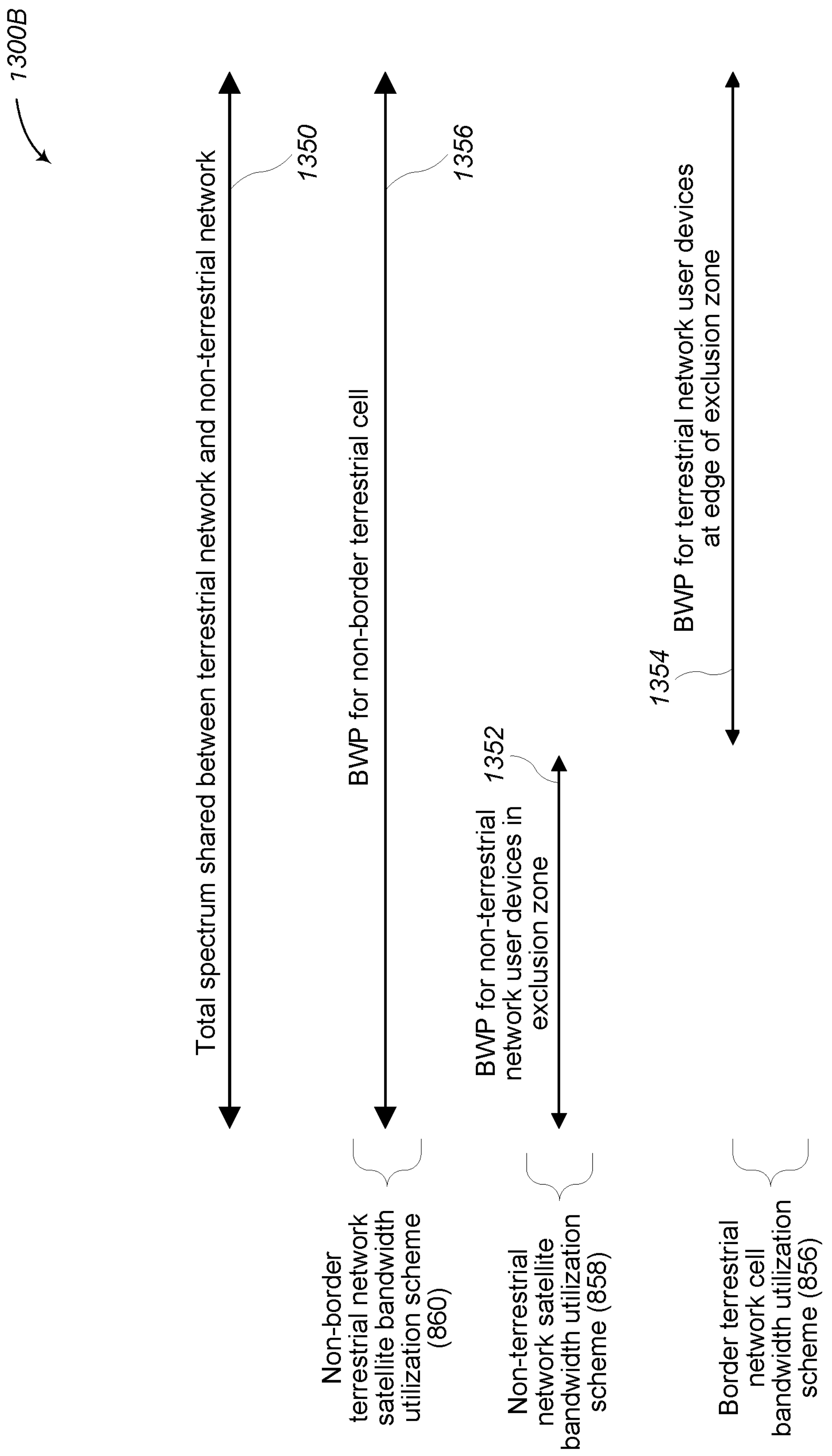

FIGS. 13A-13B are context diagrams of non-limiting example illustrations of techniques for mitigating the interference illustrated in FIGS. 11-12 in accordance with embodiments described herein. Environment 1300A in FIG. 13A is an embodiment of environment 1100 in FIG. 11 and environment 1200 in FIG. 12. For ease of illustration, environment 1300A is illustrated with non-terrestrial network satellite 1328, terrestrial network cells 1308*a*-1308*g*, and user device 1324*a*-1324*b*.

To reduce the terrestrial network downlink transmission interference on non-terrestrial network downlink transmissions and the non-terrestrial network downlink transmission interference on terrestrial network downlink transmissions, as discussed in FIGS. 11 and 12, an exclusion zone 1340 is defined or generated for a specific market or group of terrestrial network cells 1308*a*-1308*g*. The exclusion zone 1340 is an area near or outside of an edge of a terrestrial network-only zone 1330, where the terrestrial network-only zone 1330 is defined as the cumulative coverage area of the terrestrial network cells 1308*a*-1308*g*.

The terrestrial network cells 1308*a*-1308*g* may be further grouped or defined based on their position within the terrestrial network-only zone relative to the exclusion zone. For example, the terrestrial network cells that have a coverage area adjacent to the exclusion zone may be referred to as border cells, whereas terrestrial network cells that have a coverage area that is not adjacent to the exclusion zone may be referred to as non-border cells. In this case, terrestrial network cells 1308*b*-1308*g* are border cells and terrestrial network cell 1308*a* is a non-border cell.

In this illustration, user device 1324*a* is located within the exclusion zone 1340 and user device 1324*b* is located within a coverage area of border terrestrial cell 1308*f*, but near the exclusion zone 1340. The non-terrestrial network satellite 1328 can utilize a specific bandwidth utilization scheme for non-terrestrial network downlink transmissions to user device 1324*a*, whereas the border terrestrial network cell 1308*f* can utilize a different specific bandwidth utilization scheme for terrestrial network downlink transmissions to user device 1324*b*. For example, the non-terrestrial network satellite 1328 can transmit data to user device 1324*a* in the exclusion zone using specific bandwidth parts for non-terrestrial network downlink transmissions. But the border terrestrial network cell 1308*f* can transmit data to user device 1324*b* using different specific bandwidth parts for terrestrial network downlink transmissions. In this way, the non-terrestrial network downlink transmissions and the terrestrial network downlink transmissions utilize different bandwidth parts for user devices in or near the exclusion zone 1340. Non-border terrestrial network cell 1308*a* can use all bandwidth parts.

In some embodiments, the border terrestrial network cells 1308*b*-1308*g* may also divide their coverage areas into multiple regions such that terrestrial network downlink transmissions to user devices in the closer region (or in a region further from the exclusion zone) can be made using lower transmit power, similar to what is described in conjunction with FIG. 3A.

FIG. 13B illustrates bandwidth utilization schemes 1300B. In particular, the terrestrial and non-terrestrial networks have a total bandwidth spectrum 1350 available. Non-border terrestrial network cells are instructed to utilize bandwidth utilization scheme 1360, border terrestrial network cells are instructed to utilized bandwidth utilization scheme 1354, and non-terrestrial network satellite is instructed to utilize bandwidth utilization scheme 1358.

When communicating with user devices near the edge of the exclusion zone, the border terrestrial network cell can transmit data to those user devices using higher bandwidth parts 1354 for terrestrial network downlink transmissions based on the bandwidth utilization scheme 1356. For user devices within the exclusion zone, the non-terrestrial network satellite can transmit data to those user devices to using lower bandwidth parts 1352 for non-terrestrial network downlink transmissions based on the bandwidth utilization scheme 1358. And non-border terrestrial network cells can transmit data to user devices using all bandwidth parts 1356 for terrestrial network downlink transmissions based on the bandwidth utilization scheme 1360

Although the non-terrestrial network satellite bandwidth utilization scheme illustrates lower bandwidth parts for non-terrestrial user devices in the exclusion zone and the border terrestrial network cell bandwidth utilization scheme illustrates higher bandwidth parts for user devices near the exclusion zone, embodiments are not so limited. For example, in some embodiments, the non-terrestrial network satellite bandwidth utilization scheme may utilize higher bandwidth parts for non-terrestrial user devices in the exclusion zone and the border terrestrial network cell bandwidth utilization scheme may utilize lower bandwidth parts for user devices near the exclusion zone. Accordingly, embodiments may be employed such that the bandwidth utilization of terrestrial and non-terrestrial cells do not overlap or are used to reduce an amount of overlap.

The operation of certain aspects will now be described with respect to FIGS. 14-16.

Figure 14:
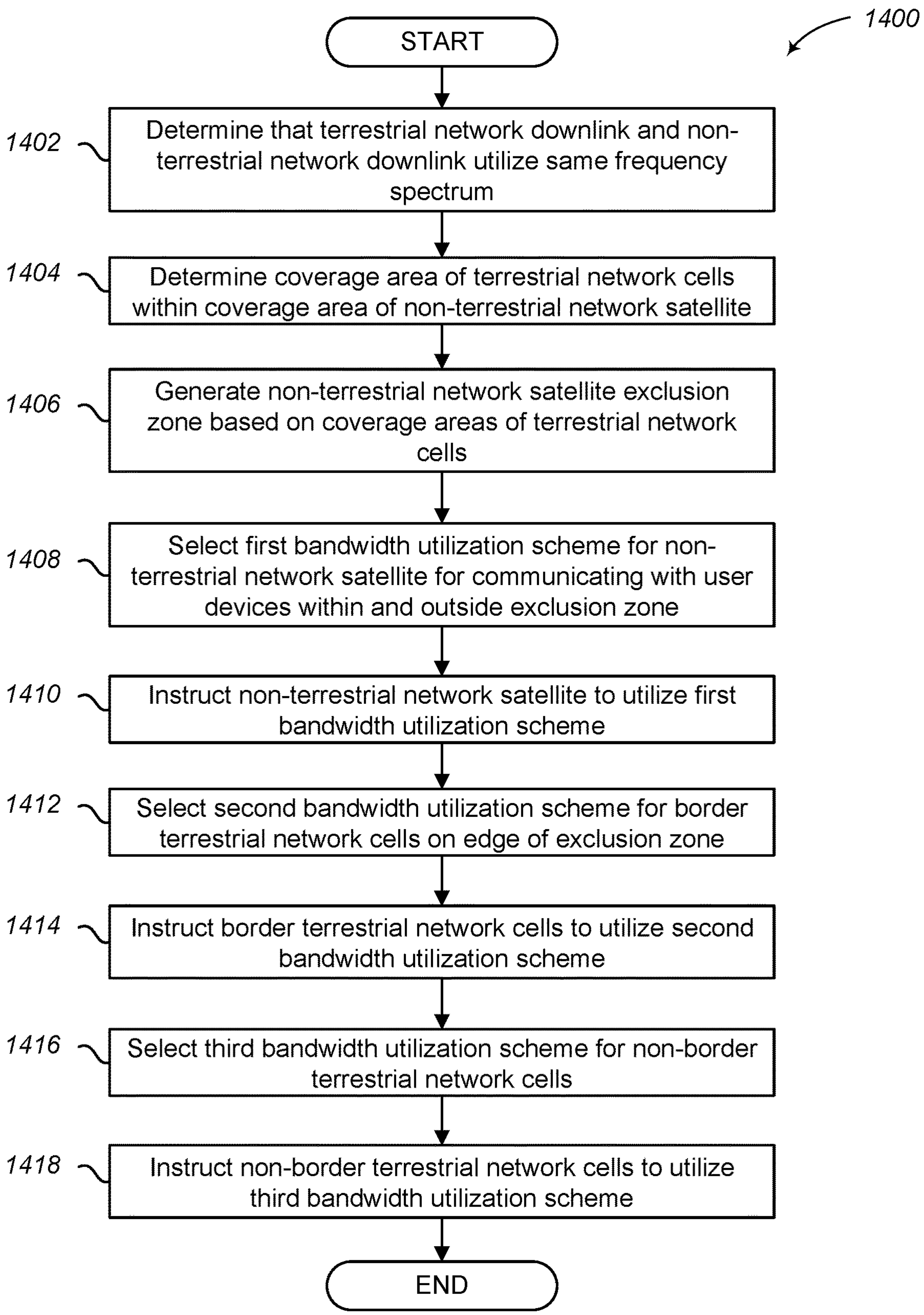
FIG. 14 illustrates a logical flow diagram showing one embodiment of a process for selecting bandwidth utilization schemes for non-terrestrial and terrestrial network cells to implement the mitigation techniques illustrated in FIGS. 13A-13B in accordance with embodiments described herein.

FIG. 14 illustrates a logical flow diagram showing one embodiment of a process 1400 for selecting bandwidth utilization schemes for non-terrestrial and terrestrial network cells to implement the mitigation techniques illustrated in FIGS. 13A-13B in accordance with embodiments described herein. In at least one of various embodiments, process 1400 may be implemented by or executed via circuitry or on one or more computing devices, such as terrestrial network and non-terrestrial network interference mitigation system 102 in FIG. 1, or one or more terrestrial or non-terrestrial cells.

Process 1400 begins, after a start block, at block 1402, where the system determines that terrestrial network downlink transmissions and non-terrestrial network downlink transmissions utilize a same frequency spectrum. In some embodiments, this determination is based on the capabilities of user devices being able to access both the terrestrial and non-terrestrial network using the same frequency spectrum. In other embodiments, this determination is based on the terrestrial and non-terrestrial networks attempting to communicate with user devices using the same frequency spectrum.

Process 1400 proceeds after block 1402 at block 1404, where a coverage area of each terrestrial network cell is determined within the coverage area of the non-terrestrial network satellite. In some embodiments, the coverage areas may be known or estimated based on the capabilities of the hardware of the terrestrial network cells and the non-terrestrial network satellite. In other embodiments, an administrator may set or define the coverage area of the terrestrial network cells and the non-terrestrial network satellite.

Process 1400 continues after block 1404 to block 1406, where an exclusion zone is generated based on the coverage areas of the terrestrial network cells. In various embodiments, the exclusion zone is generated or defined an area near an edge of the market coverage area of the terrestrial network cells, where terrestrial network cells or the non-terrestrial network satellite can transmit data to user devices in the exclusion zone, but the signal strength between the user devices and the terrestrial network cells is below a threshold value. Accordingly, the exclusion zone is an area where user devices should connect with the non-terrestrial network satellite, but may experience interference from the terrestrial network cells.

Process 1400 proceeds after block 1406 to block 1408, where a first bandwidth utilization scheme is selected for the non-terrestrial network satellite for non-terrestrial network downlink transmissions to user devices within and outside the exclusion zone. For user devices within the exclusion zone, the first bandwidth utilization scheme defines which bandwidth parts the non-terrestrial network satellite is to utilize for non-terrestrial network downlink transmissions, which is described in more detail in conjunction with FIGS. 13A-13B. Although for user devices outside the exclusion zone that connect to the non-terrestrial network satellite, the first bandwidth utilization scheme indicates that the non-terrestrial network satellite can use any available bandwidth parts for non-terrestrial network downlink transmissions with user devices outside the exclusion zone.

Process 1400 continues after block 1408 to block 1410, where the non-terrestrial network satellite is instructed to utilize the first bandwidth utilization scheme when communicating with user devices within or outside the exclusion zone. In some embodiments, the non-terrestrial network satellite may store a plurality of different possible bandwidth utilization schemes. An indication of the first bandwidth utilization scheme is then transmitted to the non-terrestrial network satellite, such that the non-terrestrial network satellite can select the previously-stored bandwidth utilization scheme that matches the first bandwidth utilization scheme. In other embodiments, the details of the first bandwidth utilization scheme are transmitted to the non-terrestrial network satellite.

Process 1400 proceeds after block 1410 to block 1412, where a second bandwidth utilization scheme is selected for border terrestrial network cells. The second bandwidth utilization scheme defines which bandwidth parts the border terrestrial network cells are to utilize for terrestrial network downlink transmissions with user devices near the exclusion zone, which is described in more detail in conjunction with FIGS. 13A-13B and FIG. 16. In some embodiments, the second bandwidth utilization scheme also indicates how the border terrestrial network cells are to divide their coverage area into regions for using the second bandwidth utilization scheme. In various embodiments, the border terrestrial network cells are those terrestrial network cells whose coverage area is adjacent to or partially overlaps the exclusion zone.

Process 1400 continues after block 1412 at block 14, where the border terrestrial network cells are instructed to utilize the second bandwidth utilization scheme. In some embodiments, the border terrestrial network cells may store a plurality of different possible bandwidth utilization schemes. An indication of the second bandwidth utilization scheme is then transmitted to the border terrestrial network cells, such that the border terrestrial network cells can select the previously-stored bandwidth utilization scheme that matches the second bandwidth utilization scheme. In other embodiments, the details of the second bandwidth utilization scheme are transmitted to the border terrestrial network cells.

Process 1400 proceeds after block 1414 to block 1416, where a third bandwidth utilization scheme is selected for non-border terrestrial network cells. The third bandwidth utilization scheme defines which bandwidth parts, such as any available bandwidth part, the non-border terrestrial network cells are to utilize for terrestrial network downlink transmissions with user devices, which is described in more detail in conjunction with FIGS. 13A-13B. In various embodiments, the non-border terrestrial network cells are those terrestrial network cells whose coverage area is not adjacent to nor partially overlaps the exclusion zone.

Process 1400 continues after block 1416 at block 1418, where the non-border terrestrial network cells are instructed to utilize the third bandwidth utilization scheme. In some embodiments, the non-border terrestrial network cells may store a plurality of different possible bandwidth utilization schemes. An indication of the third bandwidth utilization scheme is then transmitted to the non-border terrestrial network cells, such that the non-border terrestrial network cells can select the previously-stored bandwidth utilization scheme that matches the third bandwidth utilization scheme. In other embodiments, the details of the third bandwidth utilization scheme are transmitted to the non-border terrestrial network cells.

After block 1418, process 1400 terminates or otherwise returns to a calling process to perform additional actions.

Figure 15:
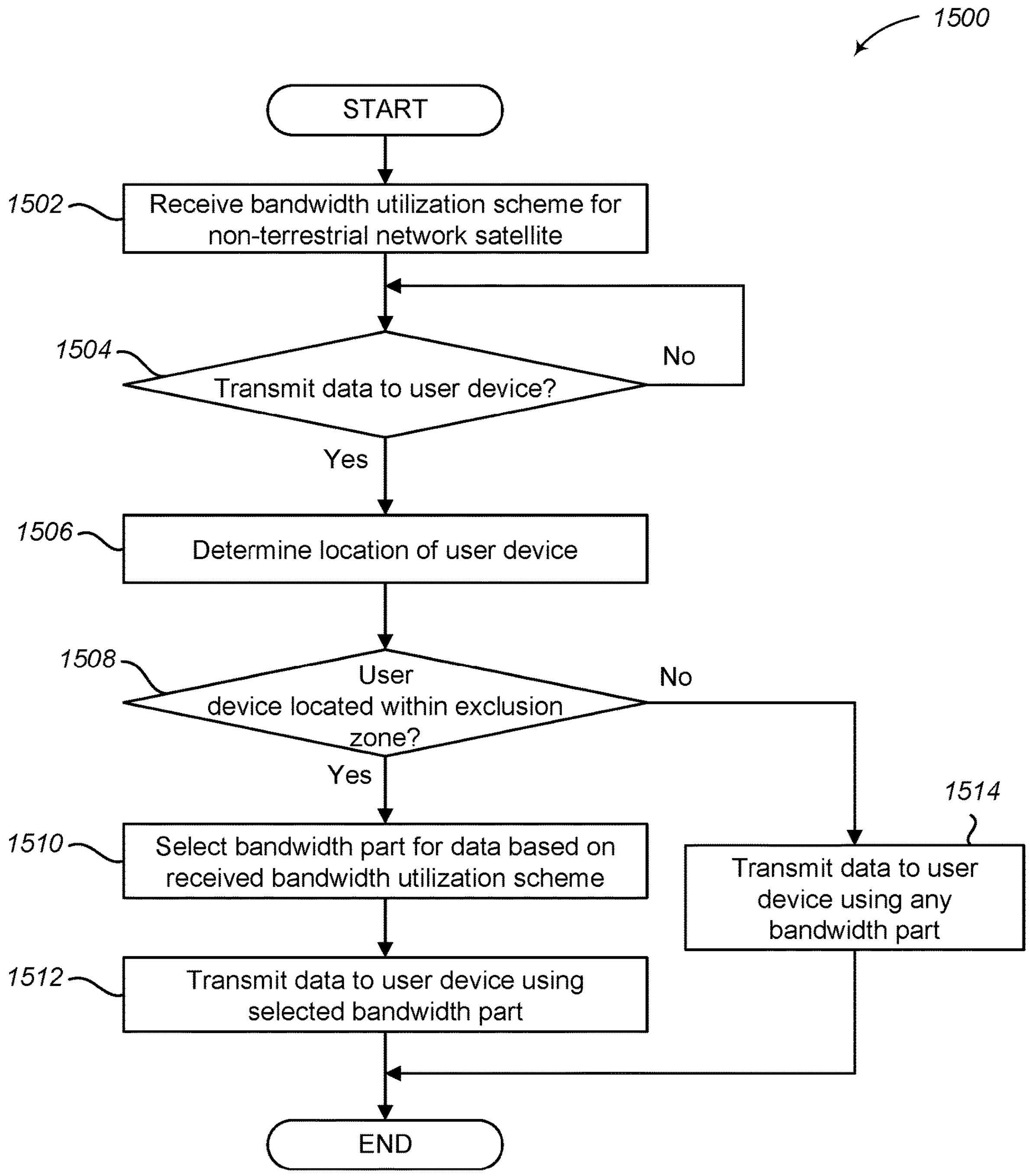
FIG. 15 illustrates a logical flow diagram showing one embodiment of a process for a non-terrestrial network satellite to implement a bandwidth utilization scheme selected in FIG. 14 in accordance with embodiments described herein.

FIG. 15 illustrates a logical flow diagram showing one embodiment of a process 1500 for a non-terrestrial network satellite to implement a bandwidth utilization scheme selected in FIG. 14 in accordance with embodiments described herein. In at least one of various embodiments, process 1500 may be implemented by or executed via circuitry or on one or more computing devices, such as non-terrestrial network satellite 128 in FIG. 1.

Process 1500 begins, after a start block, at block 1502, where a bandwidth utilization scheme is received for the non-terrestrial network satellite to utilize for non-terrestrial network downlink transmissions. In various embodiments, this bandwidth utilization scheme is the first bandwidth utilization scheme that the non-terrestrial network satellite is instructed to use at block 1410 in FIG. 14.

Process 1500 proceeds after block 1502 to decision block 1504, where a determination is made whether the non-terrestrial network satellite has data to transmit to a user device. If the non-terrestrial network satellite has data to transmit to a user device, then process 1500 proceeds to block 1506; otherwise, process 1500 loops to decision block 1504 to wait for data to transmit to a non-terrestrial user device.

Process 1500 continues after block 1504 at block 1506, where a location of the user device is determined. In various embodiments, the location of the user device is determined using GPS or other location information provided by the user device.

Process 1500 proceeds after block 1506 to decision block 1508, where a determination is made whether the user device is located with an exclusion zone. In some embodiments, the user device location may be compared to the area defined as the exclusion zone to determine if the user device is within or outside the exclusion zone. If the user device is located within the exclusion zone, then process 1500 flows to block 1510; otherwise, process 1500 flows to block 1514.

At block 1510, a bandwidth part is selected for the data transmission based on the received bandwidth utilization scheme. As discussed in FIG. 13B, different bandwidth parts may be utilized for non-terrestrial downlink transmissions to user devices within the exclusion zone and terrestrial downlink transmissions to user devices near the exclusion zone.

Process 1500 proceeds after block 1510 to block 1512, where the non-terrestrial network satellite transmits data to the user device in the exclusion zone using the selected bandwidth part. After block 1512, process 1500 terminates or otherwise returns to a calling process to perform other actions.

If, at decision block 1508, the user device is determined to be located outside the exclusion zone, process 1500 flows from decision block 1508 to block 1514. At block 1514, the non-terrestrial network satellite transmits data to the user device outside the exclusion zone using any available bandwidth part. After block 1514, process 1500 terminates or otherwise returns to a calling process to perform other actions.

Although process 1500 is illustrated as terminating or ending, embodiments are not so limited. In some embodiments, process 1500 may loop after block 1512 or block 1514 to decision block 1504 to wait for data to transmit to a non-terrestrial user device.

Figure 16:
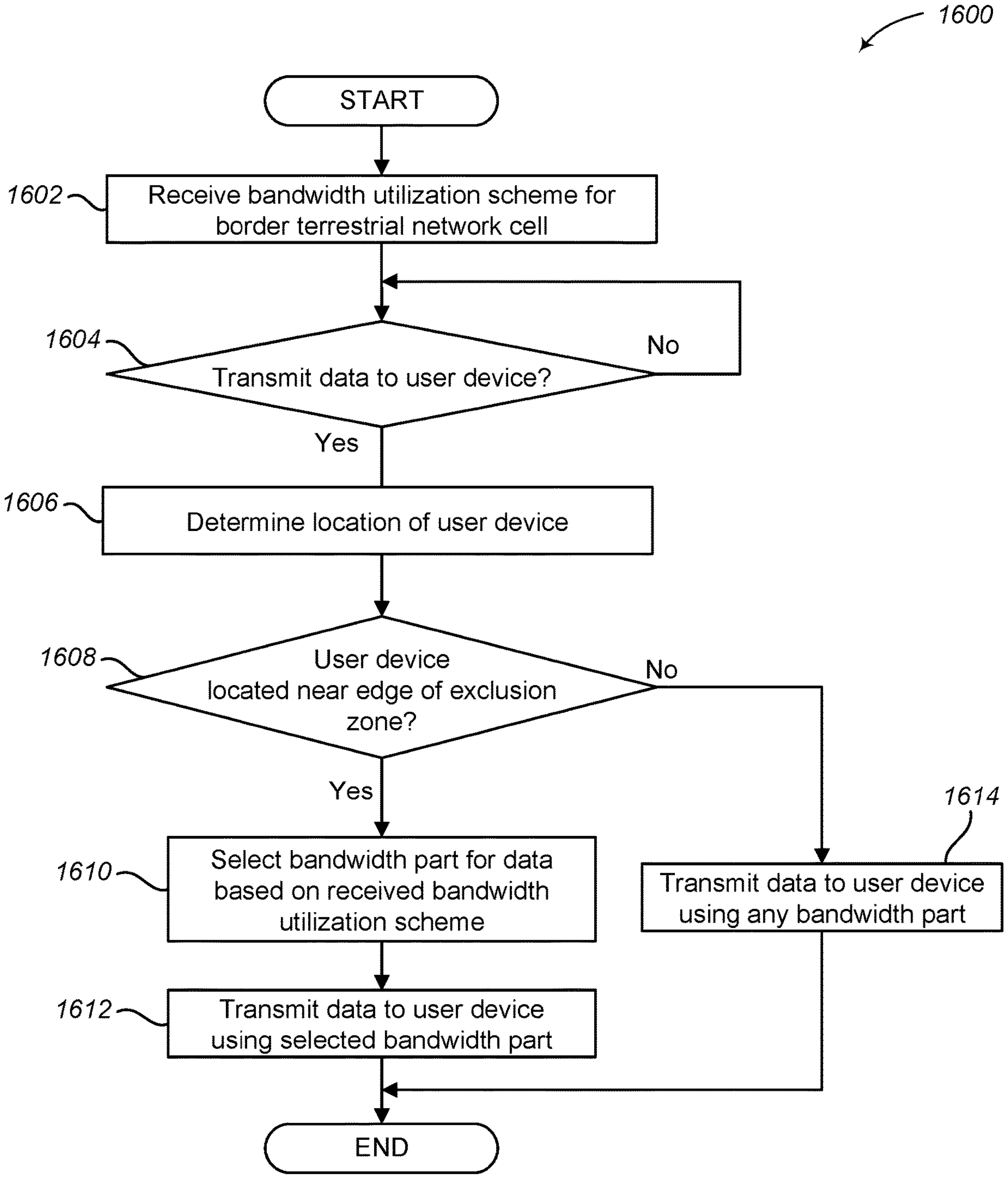
FIG. 16 illustrates a logical flow diagram showing one embodiment of a process for a border terrestrial network cell to implement a bandwidth utilization scheme selected in FIG. 14 in accordance with embodiments described herein.

FIG. 16 illustrates a logical flow diagram showing one embodiment of a process 1600 for a border terrestrial network cell to implement a bandwidth utilization scheme selected in FIG. 14 in accordance with embodiments described herein. In at least one of various embodiments, process 1600 may be implemented by or executed via circuitry or on one or more computing devices, such as terrestrial network cell 112 in FIG. 1.

Process 1600 begins, after a start block, at block 1602, where a bandwidth utilization scheme is received for a border terrestrial network cell to utilize for terrestrial network downlink transmissions. In various embodiments, this bandwidth utilization scheme is the second bandwidth utilization scheme that the border terrestrial network cell is instructed to use at block 1414 in FIG. 14.

Process 1600 proceeds after block 1602 to decision block 1604, where a determination is made whether the border terrestrial network cell has data to transmit to a user device. If the border terrestrial network cell has data to transmit to a user device, then process 1600 proceeds to block 1606; otherwise, process 1600 loops to decision block 1604 to wait for data to transmit to a terrestrial user device.

Process 1600 continues after block 1604 at block 1606, where a location of the user device is determined. In various embodiments, the location of the user device is determined using CQI data, GPS, or other location information provided by the user device.

Process 1600 proceeds after block 1606 to decision block 1608, where a determination is made whether the user device is located near an edge of an exclusion zone. In some embodiments, the user device location may be compared to the area defined as the exclusion zone to determine if the user device is near the exclusion zone. The user device may be near the exclusion zone if it is located within a threshold distance from an edge of the exclusion zone. If the user device is located near the exclusion zone, then process 1600 flows to block 1610; otherwise, process 1600 flows to block 1614.

At block 1610, a bandwidth part is selected for the data transmission based on the received bandwidth utilization scheme. As discussed in FIG. 13B, different bandwidth parts may be utilized for non-terrestrial downlink transmissions to user devices within the exclusion zone and terrestrial downlink transmissions to user devices near the exclusion zone.

Process 1600 proceeds after block 1610 to block 1612, where the border terrestrial network cell transmits data to the user device near the exclusion zone using the selected bandwidth part. After block 1612, process 1600 terminates or otherwise returns to a calling process to perform other actions.

If, at decision block 1608, the user device is determined to be located away from the exclusion zone (e.g., the user device is located outside a threshold distance from an edge of the exclusion zone), process 1600 flows from decision block 1608 to block 1614. At block 1614, the border terrestrial network cell transmits data to the user device using any available bandwidth part. After block 1614, process 1600 terminates or otherwise returns to a calling process to perform other actions.

Although process 1600 is illustrated as terminating or ending, embodiments are not so limited. In some embodiments, process 1600 may loop after block 1612 or block 1614 to decision block 1604 to wait for data to transmit to a terrestrial user device.

As described herein, one or more bandwidth utilization schemes may be selected for use by one or more terrestrial network cells or one or more non-terrestrial network satellites to reduce various network interferences. In some embodiments, the network interference may be predicted, such that the bandwidth utilization schemes may be dynamically selected or modified to proactively reduce or mitigate network interference. The operation of certain aspects will now be described with respect to FIGS. 17-19.

Figure 17:
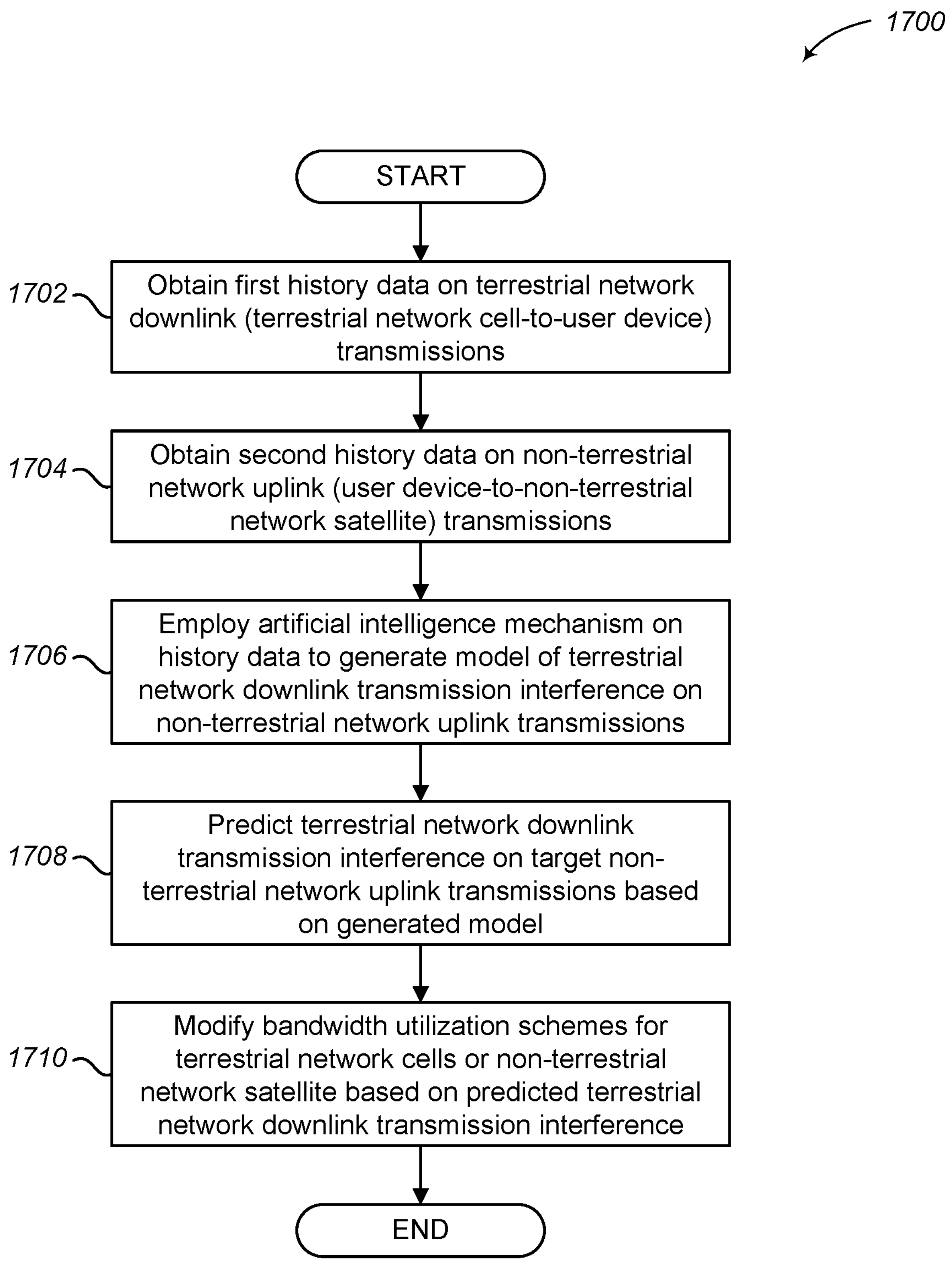
FIGS. 17-19 illustrate logical flow diagrams showing various embodiments of processes for utilizing at least one artificial intelligence mechanism to predict network interference in accordance with embodiments described herein.

FIG. 17 illustrates a logical flow diagram showing an embodiment of a process 1700 for utilizing at least one artificial intelligence mechanism to predict terrestrial network downlink transmission interference on non-terrestrial network uplink transmissions in accordance with embodiments described herein.

Process 1700 begins, after a start block at block 1702, where first history data is obtained on terrestrial network downlink transmissions. In various embodiments, the terrestrial network downlink transmission history data includes a plurality of previous data regarding transmissions from at least one terrestrial network cell to at least one user device. The history data may include a variety of information related to the terrestrial network downlink transmissions, including, locations of terrestrial network cells, locations of user devices, configuration or settings of the terrestrial network cells, configuration or settings of the user devices, hardware capabilities of the terrestrial network cells, hardware capabilities of the user devices, quality information of the transmissions, etc.

Process 1700 proceeds after block 1702 to block 1704, where second history data is obtained on non-terrestrial network uplink transmissions. In various embodiments, the non-terrestrial network uplink transmission history data includes a plurality of previous data regarding transmissions from at least one user device to at least one non-terrestrial network satellite. The history data may include a variety of information related to the non-terrestrial network uplink transmissions, including, position or location of the non-terrestrial network satellite, locations of user devices, configuration or settings of the non-terrestrial network satellite, configuration or settings of the user devices, hardware capabilities of the non-terrestrial network satellite, hardware capabilities of the user devices, quality information of the transmissions, etc.

Process 1700 continues after block 1704 at block 1706, where at least one artificial intelligence mechanism is employed on the first and second history data to generate or train a model of terrestrial network downlink transmission interference on non-terrestrial network uplink transmissions. The artificial intelligence mechanisms may be neural networks, machine learning models, etc. In some embodiments, the first history data and the second history data are used as input into the at least one artificial intelligence mechanism, such that the generated, trained, or resulting model predicts how terrestrial network downlink transmissions may cause interference on non-terrestrial network uplink transmissions.

Process 1700 proceeds after block 1706 to block 1708, where terrestrial network downlink transmission interference is predicted on target non-terrestrial network uplink transmissions based on the generated/trained model. In various embodiments, the input to the model may include locations of terrestrial network cells, location of the non-terrestrial network satellite, predicted locations of user devices, configuration or settings of the terrestrial network cells, configuration or settings of the non-terrestrial network satellite, configuration or settings of user devices, hardware capabilities of the terrestrial network cells, hardware capabilities of the non-terrestrial network satellite, hardware capabilities of the user devices, expected quality information, etc. The output of the model may be a predicted amount or type of interference that terrestrial network downlink transmissions may have on non-terrestrial network uplink transmissions.

Process 1700 continues after block 1708 at block 1710, where one or more bandwidth utilization schemes for the terrestrial network cells or the non-terrestrial network satellite may be modified based on the predicted terrestrial network downlink transmission interference. In various embodiments, the bandwidth utilization scheme that is modified may be one or more of the bandwidth utilization schemes discussed in conjunction with FIGS. 2, 3A-3B, and 4-6. Such modifications may include, but are not limited to changes in which bandwidth parts are selected for transmissions, size or number of regions utilized by terrestrial network cells, utilization of reduced transmit power, etc., or some combination thereof.

After block 1710, process 1700 terminates or otherwise returns to a calling process to perform other actions.

Figure 18:
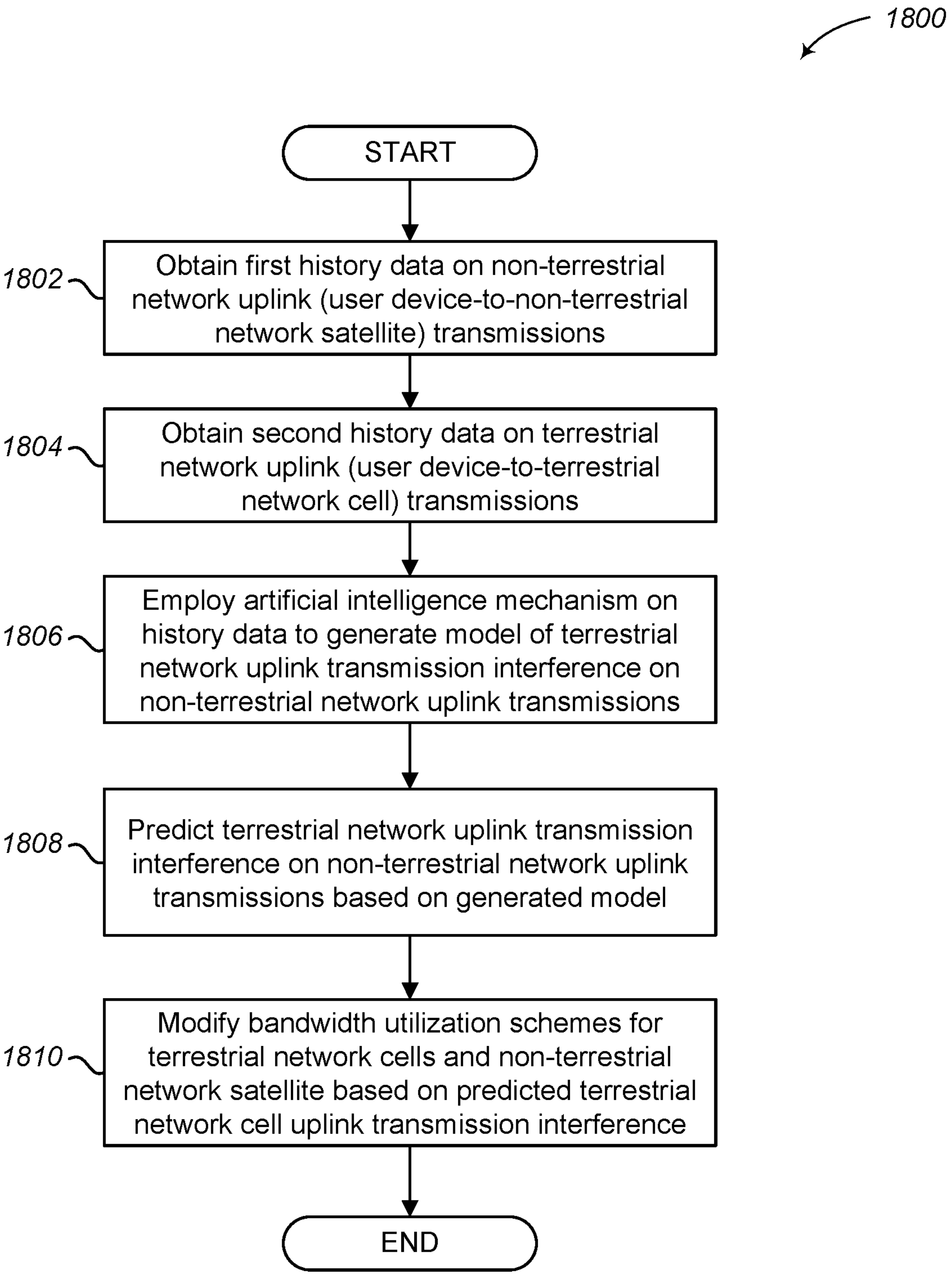

FIG. 18 illustrates a logical flow diagram showing an embodiment of a process 1800 for utilizing at least one artificial intelligence mechanism to predict terrestrial network uplink transmission interference on non-terrestrial network uplink transmissions in accordance with embodiments described herein.

Process 1800 begins, after a start block at block 1802, where first history data is obtained on non-terrestrial network uplink transmissions. In various embodiments, the non-terrestrial network uplink transmission history data includes a plurality of previous data regarding transmissions from at least one user device to at least one non-terrestrial network satellite. The history data may include a variety of information related to the non-terrestrial network uplink transmissions, including, locations of non-terrestrial network satellites, locations of user devices, configuration or settings of the non-terrestrial network satellites, configuration or settings of the user devices, hardware capabilities of the non-terrestrial network satellites, hardware capabilities of the user devices, quality information of the transmissions, etc.

Process 1800 proceeds after block 1802 to block 1804, where second history data is obtained on terrestrial network uplink transmissions. In various embodiments, the terrestrial network uplink transmission history data includes a plurality of previous data regarding transmissions from at least one user device to at least one terrestrial network cell. The history data may include a variety of information related to the terrestrial network uplink transmissions, including, position or location of terrestrial network cells, locations of user devices, configuration or settings of the terrestrial network cells, configuration or settings of the user devices, hardware capabilities of the terrestrial network cells, hardware capabilities of the user devices, quality information of the transmissions, etc.

Process 1800 continues after block 1804 at block 1806, where at least one artificial intelligence mechanism is employed on the first and second history data to train or generate a model of terrestrial network uplink transmission interference on non-terrestrial network uplink transmissions. The artificial intelligence mechanisms may be neural networks, machine learning models, etc. In some embodiments, the first history data and the second history data are used as input into the at least one artificial intelligence mechanism, such that the generated, trained, or resulting model predicts how terrestrial network uplink transmissions may cause interference on non-terrestrial network uplink transmissions.

Process 1800 proceeds after block 1806 to block 1808, where terrestrial network uplink transmission interference is predicted on target non-terrestrial network uplink transmissions based on the generated/trained model. Similar to block 1708 in FIG. 7, the input to the model may include locations of terrestrial network cells, location of the non-terrestrial network satellite, predicted locations of user devices, configuration or settings of the terrestrial network cells, configuration or settings of the non-terrestrial network satellite, configuration or settings of user devices, hardware capabilities of the terrestrial network cells, hardware capabilities of the non-terrestrial network satellite, hardware capabilities of the user devices, expected quality information, etc. The output of the model may be a predicted amount or type of interference that terrestrial network uplink transmissions may have on non-terrestrial network uplink transmissions.

Process 1800 continues after block 1808 at block 1810, where one or more bandwidth utilization schemes for the terrestrial network cells or the non-terrestrial network satellite may be modified based on the predicted terrestrial network uplink transmission interference. In various embodiments, the bandwidth utilization scheme that is modified may be one or more of the bandwidth utilization schemes discussed in conjunction with FIGS. 7, 8A-8B, and 9-10. Such modifications may include, but are not limited to changes in which bandwidth parts are selected for transmissions, size or number of regions utilized by terrestrial network cells, etc., or some combination thereof.

After block 1810, process 1800 terminates or otherwise returns to a calling process to perform other actions.

Figure 19:
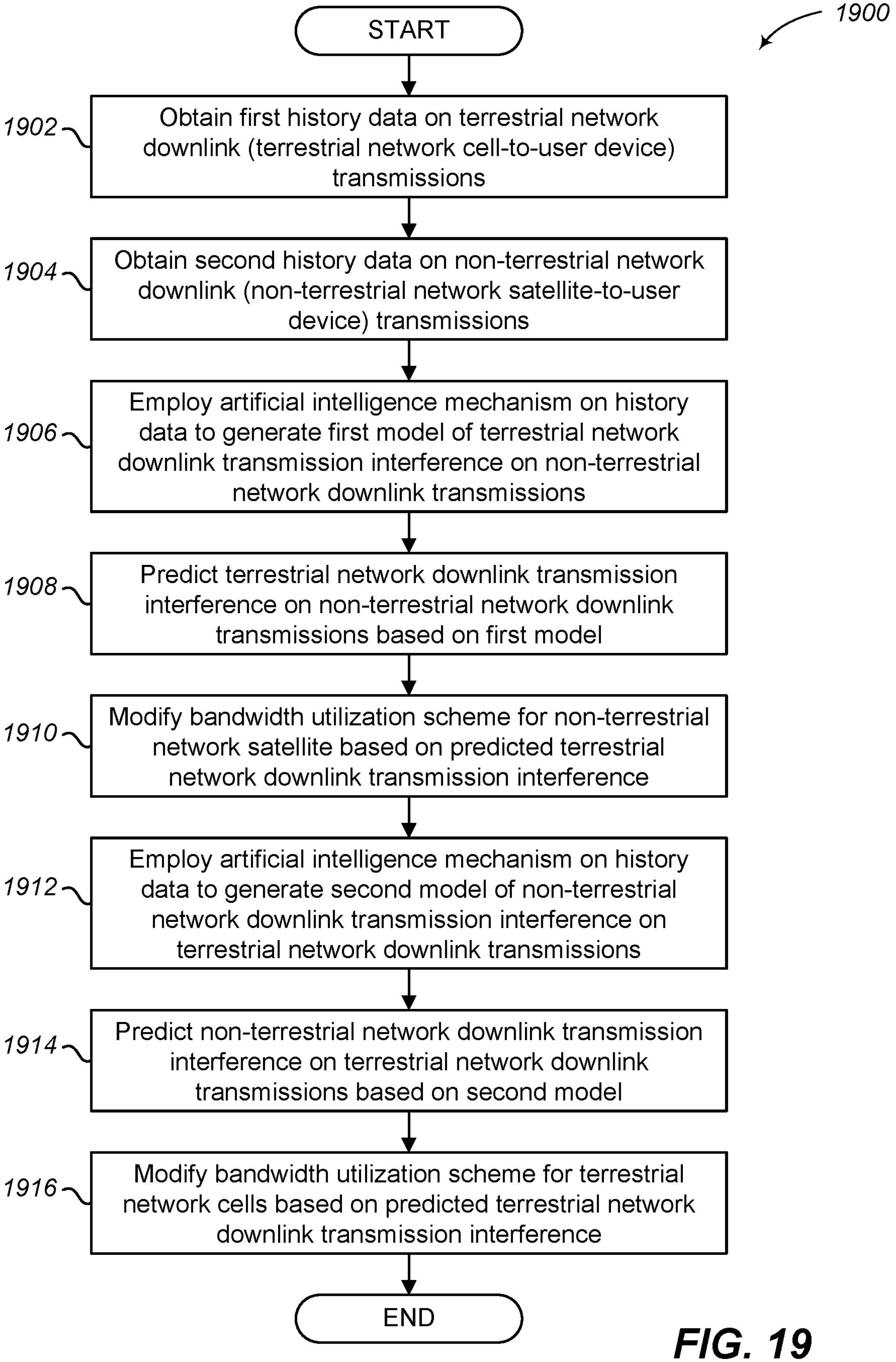

FIG. 19 illustrates a logical flow diagram showing an embodiment of a process 1800 for utilizing at least one artificial intelligence mechanism to predict terrestrial network downlink transmission interference on non-terrestrial network downlink transmissions and to predict non-terrestrial network downlink transmission interference on terrestrial network downlink transmissions in accordance with embodiments described herein.

Process 1900 begins, after a start block at block 1902, where first history data is obtained on terrestrial network downlink transmissions. In various embodiments, block 1902 may employ embodiments of block 1702 in FIG. 17 to obtain the terrestrial network downlink transmission history data.

Process 1900 proceeds after block 1902 to block 1904, where second history data is obtained on non-terrestrial network downlink transmissions. In various embodiments, the non-terrestrial network downlink transmission history data includes a plurality of previous data regarding transmissions from at least one non-terrestrial network satellite to at least one user device. The history data may include a variety of information related to the non-terrestrial network downlink transmissions, including, position or location of the non-terrestrial network satellite, locations of user devices, configuration or settings of the non-terrestrial network satellite, configuration or settings of the user devices, hardware capabilities of the non-terrestrial network satellite, hardware capabilities of the user devices, quality information of the transmissions, etc.

Process 1900 continues after block 1904 at block 1906, where at least one artificial intelligence mechanism is employed on the first and second history data to generate or train a model of terrestrial network downlink transmission interference on non-terrestrial network downlink transmissions. The artificial intelligence mechanisms may be neural networks, machine learning models, etc. In some embodiments, the first history data and the second history data are used as input into the at least one artificial intelligence mechanism, such that the generated, trained, or resulting model predicts how terrestrial network downlink transmissions cause interference on non-terrestrial network downlink transmissions.

Process 1900 proceeds after block 1906 to block 1908, where terrestrial network downlink transmission interference is predicted on target non-terrestrial network downlink transmissions based on the generated/trained model. In various embodiments, the input to the model may include locations of terrestrial network cells, location of the non-terrestrial network satellite, predicted locations of user devices, configuration or settings of the terrestrial network cells, configuration or settings of the non-terrestrial network satellite, configuration or settings of user devices, hardware capabilities of the terrestrial network cells, hardware capabilities of the non-terrestrial network satellite, hardware capabilities of the user devices, expected quality information, etc. The output of the model may be a predicted amount or type of interference that terrestrial network downlink transmissions may have on non-terrestrial network downlink transmissions.

Process 1900 continues after block 1908 at block 1910, where one or more bandwidth utilization schemes for the non-terrestrial network satellite may be modified based on the predicted terrestrial network downlink transmission interference. In various embodiments, the bandwidth utilization scheme that is modified may be one or more of the bandwidth utilization schemes discussed in conjunction with FIGS. 11, 13A-13B, and 14-15. Such modifications may include, but are not limited to changes in which bandwidth parts are selected for transmissions, size or position of the exclusion zone, etc., or some combination thereof.

Process 1900 continues after block 1910 at block 1912, where at least one artificial intelligence mechanism is employed on the first and second history data to generate or train a model of non-terrestrial network downlink transmission interference on terrestrial network downlink transmissions. The artificial intelligence mechanisms may be neural networks, machine learning models, etc. In some embodiments, the first history data and the second history data are used as input into the at least one artificial intelligence mechanism, such that the generated, trained, or resulting model predicts how non-terrestrial network downlink transmissions cause interference on terrestrial network downlink transmissions.

Process 1900 proceeds after block 1912 to block 1914, where non-terrestrial network downlink transmission interference is predicted on target terrestrial network downlink transmissions based on the generated/trained model. In various embodiments, the input to the model may include locations of terrestrial network cells, location of the non-terrestrial network satellite, predicted locations of user devices, configuration or settings of the terrestrial network cells, configuration or settings of the non-terrestrial network satellite, configuration or settings of user devices, hardware capabilities of the terrestrial network cells, hardware capabilities of the non-terrestrial network satellite, hardware capabilities of the user devices, expected quality information, etc. The output of the model may be a predicted amount or type of interference that non-terrestrial network downlink transmissions may have on terrestrial network downlink transmissions.

Process 1900 continues after block 1914 at block 1916, where one or more bandwidth utilization schemes for one or more border terrestrial network cells may be modified based on the predicted non-terrestrial network downlink transmission interference. In various embodiments, the bandwidth utilization scheme that is modified may be one or more of the bandwidth utilization schemes discussed in conjunction with FIGS. 12, 13A-13B, 14, and 16. Such modifications may include, but are not limited to changes in which bandwidth parts are selected for transmissions, size or position of the exclusion zone, etc., or some combination thereof.

After block 1916, process 1900 terminates or otherwise returns to a calling process to perform other actions.

Figure 20:
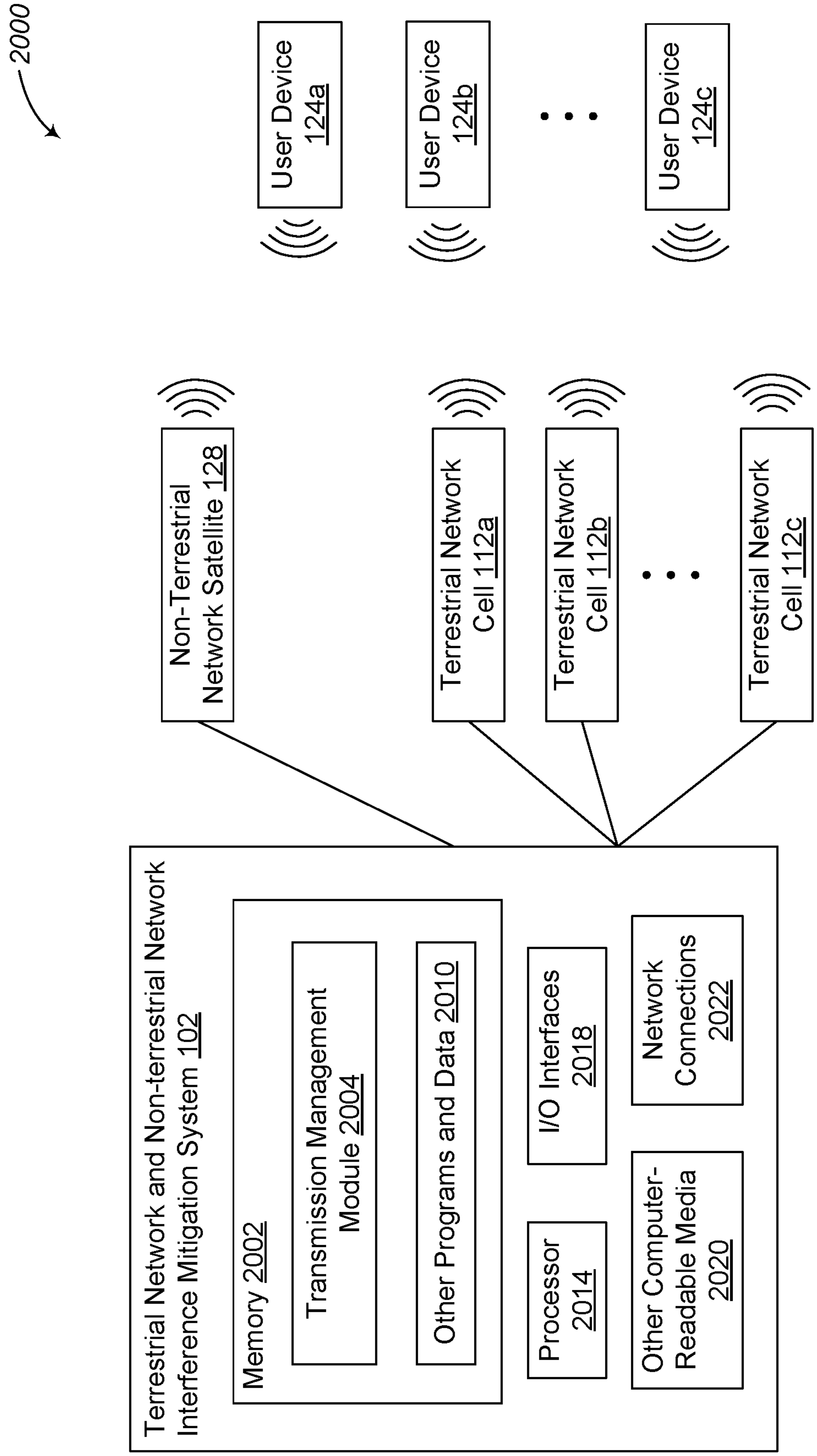
FIG. 20 shows a system diagram that describes one implementation of computing systems for implementing embodiments described herein.

FIG. 20 shows a system diagram that describes one implementation of computing systems for implementing embodiments described herein. System 2000 includes terrestrial network and non-terrestrial network interference mitigation system 102, non-terrestrial network satellite 128, terrestrial network cells 112*a*-112*c*, user devices 124*a*-124*c*, similar to what is described herein.

As described herein, the terrestrial network and non-terrestrial network interference mitigation system 102 is a computing device that can perform functionality described herein for selecting bandwidth utilization schemes for terrestrial network cells 112*a*-112*b* and non-terrestrial network satellite 128 to utilize to mitigate interference. One or more special purpose computing systems may be used to implement the terrestrial network and non-terrestrial network interference mitigation system 102. Accordingly, various embodiments described herein may be implemented in specialized software, hardware, firmware, or in some combination thereof. The terrestrial network and non-terrestrial network interference mitigation system 102 includes memory 2002, processor 2014, network connections 2022, input/output (I/O) interfaces 2018, and other computer-readable media 2020.

Processor 2014 includes one or more processors, one or more processing units, programmable logic, circuitry, or one or more other computing components that are configured to perform embodiments described herein or to execute computer instructions to perform embodiments described herein. In some embodiments, a processor system of the terrestrial network and non-terrestrial network interference mitigation system 102 may include a single processor 2014 that operates individually to perform actions. In other embodiments, a processor system of the terrestrial network and non-terrestrial network interference mitigation system 102 may include a plurality of processors 2014 that operate to collectively perform actions, such that one or more processors 2014 may operate to perform some, but not all, of such actions. Reference herein to "a processor system" of the terrestrial network and non-terrestrial network interference mitigation system 102 refers to one or more processors 2014 that individually or collectively perform actions. And reference herein to "the processor system" of the terrestrial network and non-terrestrial network interference mitigation system 102 refers to 1) a subset or all of the one or more processors 2014 comprised by "a processor system" of the remote server 102 and 2) any combination of the one or more processors 2014 comprised by "a processor system" of the terrestrial network and non-terrestrial network interference mitigation system 102 and one or more other processors 2014.

Memory 2002 may include one or more various types of non-volatile or volatile storage technologies. Examples of memory 2002 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 2002 may be utilized to store information, including computer-readable instructions that are utilized by a processor system of one or more processors 2014 to perform actions, including at least some embodiments described herein.

Memory 2002 may have stored thereon transmission management module 2004. The transmission management module 2004 is configured to select bandwidth utilization schemes and to instruct cells to utilize the selected bandwidth utilization schemes, as described herein. In some embodiments, the transmission management module 2004 may also employ one or more artificial intelligence mechanisms to generate or train models of interference to dynamically modify one or more bandwidth utilization schemes.

Memory 2002 may also store other programs and data 2010, such as historical transmission data, bandwidth utilization schemes, etc.

Network connections 2022 is configured to communicate with other computing devices, such as to instruct non-terrestrial network satellite 128 or terrestrial network cells 112*a*-112*c* to utilize selected bandwidth utilizations schemes. I/O interfaces 2018 may include interfaces for various input or output devices, such as USB interfaces, physical buttons, keyboards, haptic interfaces, tactile interfaces, or the like. Other computer-readable media 2020 may include other types of stationary or removable computer-readable media, such as removable flash drives, external hard drives, or the like.

The non-terrestrial network satellite 128, terrestrial network cells 112*a*-112*c*, and user devices 124*a*-124*c* may be implemented as special purpose computing systems to employ embodiments described herein. Accordingly, various embodiments described herein may be implemented in specialized software, hardware, firmware, or in some combination thereof. The non-terrestrial network satellite 128, terrestrial network cells 112*a*-112*c*, and user devices 124*a*-124*c* may include memory, processors, network interfaces, input/output (I/O) interfaces, other computer-readable media, and other components, which are not shown for ease of illustration.

The following is a summarization of the claims as originally filed.

A method may be summarized as comprising: determining that terrestrial network downlink transmissions for a terrestrial network and non-terrestrial network uplink transmissions for a non-terrestrial network utilize a same frequency band; identifying one or more terrestrial cells of the terrestrial network that are in a coverage area of a non-terrestrial network satellite of the non-terrestrial network; instructing the one or more terrestrial network cells to utilize at least a first bandwidth utilization scheme for terrestrial network downlink transmissions; and instructing the non-terrestrial network satellite of the non-terrestrial network to utilize a second bandwidth utilization scheme for non-terrestrial network uplink transmissions, wherein the second bandwidth utilization scheme is different from the first bandwidth utilization scheme.

The method may instruct the one or more terrestrial network cells to utilize at least the first bandwidth utilization scheme for the terrestrial network downlink transmissions by: selecting the first bandwidth utilization scheme for a first terrestrial network cell of the one or more terrestrial network cells; instructing the first terrestrial network cell to utilize the first bandwidth utilization scheme for terrestrial network downlink transmissions; selecting a third bandwidth utilization scheme for a second terrestrial network cell of the one or more terrestrial network cells, wherein the third bandwidth utilization scheme is different from the first bandwidth utilization scheme and different from the second bandwidth utilization scheme; and instructing the second terrestrial network cell to utilize the third bandwidth utilization scheme for terrestrial network downlink transmissions.

The method may instruct the one or more terrestrial network cells to utilize at least the first bandwidth utilization scheme for terrestrial network downlink transmissions by: grouping the one or more terrestrial network cells into a plurality of clusters; for each corresponding cluster, selecting a separate bandwidth utilization scheme; and instructing each terrestrial network cell in each corresponding cluster to utilize the separate bandwidth utilization scheme selected for the corresponding cluster for terrestrial network downlink transmissions.

The method may instruct the one or more terrestrial network cells to utilize at least the first bandwidth utilization scheme for terrestrial network downlink transmissions by: grouping the one or more terrestrial network cells into a first cluster and a second cluster; selecting the first bandwidth utilization scheme for the first cluster; instructing each terrestrial network cell in the first cluster to utilize the first bandwidth utilization scheme for terrestrial network downlink transmissions; selecting a third bandwidth utilization scheme for the second cluster, wherein the third bandwidth utilization scheme is different from the first bandwidth utilization scheme and different from the second bandwidth utilization scheme; and instructing each terrestrial network cell in the second cluster to utilize the third bandwidth utilization scheme for terrestrial network downlink transmissions.

The method may instruct the one or more terrestrial network cells to utilize at least the first bandwidth utilization scheme for terrestrial network downlink transmissions by: grouping the one or more terrestrial network cells into a plurality of clusters; and for each corresponding cluster, instructing each terrestrial network cell in the corresponding cluster to schedule synchronization signal blocks at a corresponding time-slot for the corresponding cluster, wherein the corresponding time-slot is different for each corresponding cluster.

The method may instruct the one or more terrestrial network cells to utilize at least the first bandwidth utilization scheme for terrestrial network downlink transmissions by: grouping the one or more terrestrial network cells into a plurality of clusters; and for each corresponding cluster, instructing each terrestrial network cell in the corresponding cluster to schedule synchronization signal blocks in a corresponding frequency domain for the corresponding cluster, wherein the corresponding frequency domain is different for each corresponding cluster.

The method may, further comprise: generating the first bandwidth utilization scheme to include a first order in which the one or more terrestrial network cells are to allocate physical resource blocks; and generating the second bandwidth utilization scheme to include a second order in which the non-terrestrial network satellite is to allocate physical resource blocks, wherein the second order is different from the first order.

The method may, further comprise: generating the first bandwidth utilization scheme to instruct each corresponding terrestrial network cell of the one or more terrestrial network cells to allocate physical resource blocks starting with a lowest available frequency for user devices closest to the corresponding terrestrial network cell; and generating the second bandwidth utilization scheme to instruct the non-terrestrial network satellite to allocate physical resource blocks starting with a highest available frequency for high priority transmissions.

Another method may be summarized as comprising: in response to terrestrial network downlink transmissions for a terrestrial network and non-terrestrial network uplink transmissions for a non-terrestrial network utilizing a same frequency band, receiving, by a terrestrial cell of the terrestrial network, a bandwidth utilization scheme; dividing, by the terrestrial cell, a coverage area of the terrestrial cell into at least a first region and a second region, wherein the first region is closer to the terrestrial cell than the second region; obtaining, by the terrestrial cell, a corresponding location indicator for each user device connected to the terrestrial cell; determining, by the terrestrial cell, whether each user device connected to the terrestrial cell is in the first region or the second region based on the corresponding location indicator for each user device; for each user device determined to be in the first region, transmitting, by the terrestrial cell, data to the user device using a reduced transmit power; and for each user device determined to be in the second region: selecting, by the terrestrial cell, a bandwidth part for data to be transmitted to the user device based on the received bandwidth utilization scheme; and transmitting, by the terrestrial cell, the data to the user device using the selected bandwidth part.

The other method may determine whether each user device connected to the terrestrial cell is in the first region or the second region by: determining, by the terrestrial cell, whether each user device connected to the terrestrial cell is in the first region or the second region based on the corresponding location indicator channel quality indicator received from a corresponding user device.

The other method may select a bandwidth part for data to be transmitted to the user device by: selecting, by the terrestrial cell, a first set of physical resource blocks for user devices having a first location relative to the terrestrial cell and a second set of physical resource blocks for user devices having a second location relative to the terrestrial cell.

In some embodiments, the bandwidth utilization scheme includes a specific synchronization signal block schedule for the terrestrial cell to utilize.

The other method may further comprise: utilizing, by the terrestrial cell, a synchronization signal block schedule defined in the received bandwidth utilization scheme to connect with user devices in the coverage area of the terrestrial cell.

A system may be summarized as comprising: a non-terrestrial cell of a non-terrestrial network; a plurality of terrestrial cells of a terrestrial network; and a computing device. The computing device may comprise: a memory configured to store computer instructions; and a processor system configured to execute the computer instructions to: determine that terrestrial network downlink transmissions for the terrestrial network and non-terrestrial network uplink transmissions for the non-terrestrial network utilize a same frequency band; determine that the plurality of terrestrial cells are in a coverage area of the non-terrestrial cell; group the plurality of terrestrial cells into a plurality of clusters; for each corresponding cluster, selecting a separate bandwidth utilization scheme; instruct each terrestrial cell in each corresponding cluster to utilize the separate bandwidth utilization scheme selected for the corresponding cluster for terrestrial network downlink transmissions; and instruct the non-terrestrial network satellite to utilize another bandwidth utilization scheme for non-terrestrial network uplink transmissions, wherein the other bandwidth utilization scheme is different from the separate bandwidth utilization schemes for the plurality of clusters.

The processor system of the computing device in the system may select the separate bandwidth utilization scheme for each corresponding cluster by being configured to execute the computer instructions to: select a first bandwidth utilization scheme for a first cluster of terrestrial cells; and select a second bandwidth utilization scheme for a second cluster of terrestrial cells, wherein the second bandwidth utilization scheme is different from the first bandwidth utilization scheme.

The processor system of the computing device in the system may select the separate bandwidth utilization scheme for each corresponding cluster by being configured to execute the computer instructions to: select a first synchronization signal block schedule for a first cluster of terrestrial cells; and select a second synchronization signal block schedule for a second cluster of terrestrial cells, wherein the second synchronization signal block schedule is different from the first synchronization signal block schedule.

The processor system of the computing device in the system may select the separate bandwidth utilization scheme for each corresponding cluster by being configured to execute the computer instructions to: select a first time slot for synchronization signal block transmissions for a first cluster of terrestrial cells; and select a second time slot for synchronization signal block transmissions for a second cluster of terrestrial cells, wherein the second time slot is different from the first time slot.

The processor system of the computing device in the system may select the separate bandwidth utilization scheme for each corresponding cluster by being configured to execute the computer instructions to: select a first frequency domain for synchronization signal block transmissions for a first cluster of terrestrial cells; and select a second frequency domain for synchronization signal block transmissions for a second cluster of terrestrial cells, wherein the second frequency domain is different from the first frequency domain.

Each terrestrial cell of the plurality of terrestrial cells in the system may be configured to: receive a bandwidth utilization scheme; divide a coverage area of the terrestrial cell into at least a first region and a second region, wherein the first region is closer to the terrestrial cell than the second region; obtain a corresponding location indicator for each user device connected to the terrestrial cell; determine whether each user device connected to the terrestrial cell is in the first region or the second region based on the corresponding location indicator for each user device; for each user device determined to be in the first region, transmit; and for each user device determined to be in the second region: select a bandwidth part for data to be transmitted to the user device based on the received bandwidth utilization scheme; and transmit the data to the user device using the selected bandwidth part.

The processor of the computing device may be configured to further execute the computer instructions to: generate the separate bandwidth utilization schemes for each corresponding cluster to include a first order in which corresponding terrestrial cells of each corresponding cluster are to allocate physical resource blocks; and generate the other bandwidth utilization scheme to include a second order in which the non-terrestrial cell is to allocate physical resource blocks, wherein the second order is different from the first order.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

determining that terrestrial network downlink transmissions for a terrestrial network and non-terrestrial network uplink transmissions for a non-terrestrial network utilize a same frequency band;

identifying one or more terrestrial cells of the terrestrial network that are in a coverage area of a non-terrestrial network satellite of the non-terrestrial network;

generating a first bandwidth utilization scheme to include a first order in which the one or more terrestrial network cells are to allocate physical resource blocks;

generating a second bandwidth utilization scheme to include a second order in which the non-terrestrial network satellite is to allocate physical resource blocks, wherein the second order is different from the first order such that the second bandwidth utilization scheme is different from the first bandwidth utilization scheme;

instructing the one or more terrestrial network cells to utilize the first bandwidth utilization scheme for terrestrial network downlink transmissions; and instructing the non-terrestrial network satellite of the non-terrestrial network to utilize the second bandwidth utilization scheme for non-terrestrial network uplink transmissions.

2. The method of claim 1, wherein instructing the one or more terrestrial network cells to utilize at least the first bandwidth utilization scheme for the terrestrial network downlink transmissions comprises:

selecting the first bandwidth utilization scheme for a first terrestrial network cell of the one or more terrestrial network cells;

instructing the first terrestrial network cell to utilize the first bandwidth utilization scheme for terrestrial network downlink transmissions;

selecting a third bandwidth utilization scheme for a second terrestrial network cell of the one or more terrestrial network cells, wherein the third bandwidth utilization scheme is different from the first bandwidth utilization scheme and different from the second bandwidth utilization scheme; and instructing the second terrestrial network cell to utilize the third bandwidth utilization scheme for terrestrial network downlink transmissions.

3. The method of claim 1, wherein instructing the one or more terrestrial network cells to utilize at least the first bandwidth utilization scheme for terrestrial network downlink transmissions comprises:

grouping the one or more terrestrial network cells into a plurality of clusters;

for each corresponding cluster, selecting a separate bandwidth utilization scheme; and instructing each terrestrial network cell in each corresponding cluster to utilize the separate bandwidth utilization scheme selected for the corresponding cluster for terrestrial network downlink transmissions.

4. The method of claim 1, wherein instructing the one or more terrestrial network cells to utilize at least the first bandwidth utilization scheme for terrestrial network downlink transmissions comprises:

grouping the one or more terrestrial network cells into a first cluster and a second cluster;

selecting the first bandwidth utilization scheme for the first cluster;

instructing each terrestrial network cell in the first cluster to utilize the first bandwidth utilization scheme for terrestrial network downlink transmissions;

selecting a third bandwidth utilization scheme for the second cluster, wherein the third bandwidth utilization scheme is different from the first bandwidth utilization scheme and different from the second bandwidth utilization scheme; and instructing each terrestrial network cell in the second cluster to utilize the third bandwidth utilization scheme for terrestrial network downlink transmissions.

5. The method of claim 1, wherein instructing the one or more terrestrial network cells to utilize at least the first bandwidth utilization scheme for terrestrial network downlink transmissions comprises:

grouping the one or more terrestrial network cells into a plurality of clusters; and for each corresponding cluster, instructing each terrestrial network cell in the corresponding cluster to schedule synchronization signal blocks at a corresponding time-slot for the corresponding cluster, wherein the corresponding time-slot is different for each corresponding cluster.

6. The method of claim 1, wherein instructing the one or more terrestrial network cells to utilize at least the first bandwidth utilization scheme for terrestrial network downlink transmissions comprises:

grouping the one or more terrestrial network cells into a plurality of clusters; and for each corresponding cluster, instructing each terrestrial network cell in the corresponding cluster to schedule synchronization signal blocks in a corresponding frequency domain for the corresponding cluster, wherein the corresponding frequency domain is different for each corresponding cluster.

7. The method of claim 1, further comprising:

generating the first bandwidth utilization scheme to instruct each corresponding terrestrial network cell of the one or more terrestrial network cells to allocate physical resource blocks starting with a lowest available frequency for user devices closest to the corresponding terrestrial network cell; and generating the second bandwidth utilization scheme to instruct the non-terrestrial network satellite to allocate physical resource blocks starting with a highest available frequency for high priority transmissions.

8. A method, comprising:

in response to terrestrial network downlink transmissions for a terrestrial network and non-terrestrial network uplink transmissions for a non-terrestrial network utilizing a same frequency band, receiving, by a terrestrial cell of the terrestrial network, a bandwidth utilization scheme;

dividing, by the terrestrial cell, a coverage area of the terrestrial cell into at least a first region and a second region, wherein the first region is closer to the terrestrial cell than the second region;

obtaining, by the terrestrial cell, a corresponding location indicator for each user device connected to the terrestrial cell;

determining, by the terrestrial cell, whether each user device connected to the terrestrial cell is in the first region or the second region based on the corresponding location indicator for each user device;

for each user device determined to be in the first region, transmitting, by the terrestrial cell, data to the user device using a reduced transmit power; and for each user device determined to be in the second region:

selecting, by the terrestrial cell, a bandwidth part for data to be transmitted to the user device based on the received bandwidth utilization scheme; and transmitting, by the terrestrial cell, the data to the user device using the selected bandwidth part.

9. The method of claim 8, wherein determining whether each user device connected to the terrestrial cell is in the first region or the second region comprises:

determining, by the terrestrial cell, whether each user device connected to the terrestrial cell is in the first region or the second region based on the corresponding location indicator received from a corresponding user device.

10. The method of claim 8, wherein selecting a bandwidth part for data to be transmitted to the user device comprises:

selecting, by the terrestrial cell, a first set of physical resource blocks for user devices having a first location relative to the terrestrial cell and a second set of physical resource blocks for user devices having a second location relative to the terrestrial cell.

11. The method of claim 8, wherein the bandwidth utilization scheme includes a specific synchronization signal block schedule for the terrestrial cell to utilize.

12. The method of claim 8, further comprising:

utilizing, by the terrestrial cell, a synchronization signal block schedule defined in the received bandwidth utilization scheme to connect with user devices in the coverage area of the terrestrial cell.

13. A system, comprising:

a non-terrestrial cell of a non-terrestrial network;

a plurality of terrestrial cells of a terrestrial network; and a computing device, comprising:

a memory configured to store computer instructions; and a processor system configured to execute the computer instructions to:

determine that terrestrial network downlink transmissions for the terrestrial network and non-terrestrial network uplink transmissions for the non-terrestrial network utilize a same frequency band;

determine that the plurality of terrestrial cells are in a coverage area of the non-terrestrial cell;

group the plurality of terrestrial cells into a plurality of clusters, with each corresponding cluster containing multiple terrestrial cells;

for each corresponding cluster, selecting a separate bandwidth utilization scheme;

instruct each terrestrial cell in each corresponding cluster to utilize the separate bandwidth utilization scheme selected for the corresponding cluster for terrestrial network downlink transmissions; and instruct the non-terrestrial network satellite to utilize another bandwidth utilization scheme for non-terrestrial network uplink transmissions, wherein the other bandwidth utilization scheme is different from the separate bandwidth utilization schemes for the plurality of clusters.

14. The system of claim 13, wherein the processor selects the separate bandwidth utilization scheme for each corresponding cluster by being configured to execute the computer instructions to:

select a first bandwidth utilization scheme for a first cluster of terrestrial cells; and select a second bandwidth utilization scheme for a second cluster of terrestrial cells, wherein the second bandwidth utilization scheme is different from the first bandwidth utilization scheme.

15. The system of claim 13, wherein the processor selects the separate bandwidth utilization scheme for each corresponding cluster by being configured to execute the computer instructions to:

select a first synchronization signal block schedule for a first cluster of terrestrial cells; and select a second synchronization signal block schedule for a second cluster of terrestrial cells, wherein the second synchronization signal block schedule is different from the first synchronization signal block schedule.

16. The system of claim 13, wherein the processor selects the separate bandwidth utilization scheme for each corresponding cluster by being configured to execute the computer instructions to:

select a first time slot for synchronization signal block transmissions for a first cluster of terrestrial cells; and select a second time slot for synchronization signal block transmissions for a second cluster of terrestrial cells, wherein the second time slot is different from the first time slot.

17. The system of claim 13, wherein the processor selects the separate bandwidth utilization scheme for each corresponding cluster by being configured to execute the computer instructions to:

select a first frequency domain for synchronization signal block transmissions for a first cluster of terrestrial cells; and select a second frequency domain for synchronization signal block transmissions for a second cluster of terrestrial cells, wherein the second frequency domain is different from the first frequency domain.

18. The system of claim 13, wherein each terrestrial cell of the plurality of terrestrial cells is configured to:

receive a bandwidth utilization scheme;

divide a coverage area of the terrestrial cell into at least a first region and a second region, wherein the first region is closer to the terrestrial cell than the second region;

obtain a corresponding location indicator for each user device connected to the terrestrial cell;

determine whether each user device connected to the terrestrial cell is in the first region or the second region based on the corresponding location indicator for each user device;

for each user device determined to be in the first region, transmit; and for each user device determined to be in the second region:

select a bandwidth part for data to be transmitted to the user device based on the received bandwidth utilization scheme; and transmit the data to the user device using the selected bandwidth part.

19. The system of claim 13, wherein the processor is configured to further execute the computer instructions to:

generate the separate bandwidth utilization schemes for each corresponding cluster to include a first order in which corresponding terrestrial cells of each corresponding cluster are to allocate physical resource blocks; and generate the other bandwidth utilization scheme to include a second order in which the non-terrestrial cell is to allocate physical resource blocks, wherein the second order is different from the first order.

* * * * *